(12) United States Patent
Bhandarkar et al.

(10) Patent No.: US 10,799,847 B2
(45) Date of Patent: Oct. 13, 2020

(54) POLYOLEFIN PRODUCTION WITH MULTIPLE POLYMERIZATION REACTORS

(71) Applicant: Chevron Phillips Chemical Company, LP, The Woodlands, TX (US)

(72) Inventors: Maruti Bhandarkar, Kingwood, TX (US); Elizabeth Ann Benham, Spring, TX (US); Rebecca A. Gonzales, Houston, TX (US); Scott E. Kufeld, Houston, TX (US); Joel A. Mutchler, Porter, TX (US); Catherine M. Gill, Kingwood, TX (US); Thanh T. Nguyen, Sugar Land, TX (US); Timothy O. Odi, Kingwood, TX (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 519 days.

(21) Appl. No.: 15/269,050

(22) Filed: Sep. 19, 2016

(65) Prior Publication Data
US 2017/0001167 A1    Jan. 5, 2017

Related U.S. Application Data

(63) Continuation of application No. 13/682,336, filed on Nov. 20, 2012.

(51) Int. Cl.
*B01J 19/24* (2006.01)
*C08F 2/00* (2006.01)
(Continued)

(52) U.S. Cl.
CPC ......... *B01J 19/245* (2013.01); *B01J 19/1818* (2013.01); *B01J 19/1825* (2013.01);
(Continued)

(58) Field of Classification Search
CPC . B01J 19/24; B01J 19/18; B01J 19/245; B01J 19/1825; B01J 19/1837;
(Continued)

(56) References Cited

U.S. PATENT DOCUMENTS 6,239,235 B1   5/2001   Hottovy et al.
6,926,088 B2   8/2005   Tinker
(Continued)

FOREIGN PATENT DOCUMENTS

EP   1564224 A1   8/2005
EP   1611948 A1   1/2006
(Continued)

OTHER PUBLICATIONS

PCT International Search Report for PCT/US2013/070675 dated Apr. 2, 2014 (4 pages).
(Continued)

*Primary Examiner* — Huy Tram Nguyen
(74) *Attorney, Agent, or Firm* — Eversheds Sutherland (US) LLP

(57) ABSTRACT

A polyolefin production system including: a first reactor configured to produce a first discharge slurry having a first polyolefin; a second reactor configured to produce a second discharge slurry having a second polyolefin; and a post-reactor treatment zone having at least a separation vessel configured to receive the second discharge slurry or both the first discharge slurry and the second discharge slurry.

34 Claims, 12 Drawing Sheets

(51) Int. Cl.
*B01J 19/18* (2006.01)
*C08F 2/01* (2006.01)

(52) U.S. Cl.
CPC ....... *B01J 19/1837* (2013.01); *B01J 19/2455* (2013.01); *B01J 19/2465* (2013.01); *C08F 2/001* (2013.01); *C08F 2/01* (2013.01); *B01J 2219/00024* (2013.01); *B01J 2219/24* (2013.01)

(58) Field of Classification Search
CPC ................ B01J 19/1818; B01J 19/2455; B01J 19/2465; B01J 2219/24; B01J 2219/00024; C08F 2/00; C08F 2/001; C08F 2/01
USPC ......................................................... 422/132
See application file for complete search history.

(56) References Cited

U.S. PATENT DOCUMENTS

| | | | |
|---|---|---|---|
| 7,390,860 B2 | 6/2008 | Tharappel et al. | |
| 8,025,847 B2 | 9/2011 | Fouarge et al. | |
| 8,138,269 B2 | 3/2012 | Kiss et al. | |
| 8,143,352 B2 | 3/2012 | Kiss et al. | |
| 2005/0272891 A1 | 12/2005 | Fouarge et al. | |
| 2006/0183861 A1 | 8/2006 | Harrington et al. | |
| 2008/0221280 A1 | 9/2008 | Damme | |
| 2011/0124828 A1 | 5/2011 | Fouarge | |
| 2011/0201765 A1 | 8/2011 | Odi | |
| 2011/0288247 A1 | 11/2011 | Hottovy et al. | |
| 2012/0053304 A1 | 3/2012 | Fouarge et al. | |

FOREIGN PATENT DOCUMENTS

| | | |
|---|---|---|
| EP | 1825910 | 8/2007 |
| EP | 2289952 A1 | 3/2011 |
| WO | 2005068516 A2 | 7/2005 |
| WO | 2006044149 | 4/2006 |

OTHER PUBLICATIONS

EP Office Action dated Oct. 5, 2018 issued in corresponding EP Application No. 13798875.4, Publication No. 2922627, 5 pages.

… (1 / 2)

POLYOLEFIN PRODUCTION WITH MULTIPLE POLYMERIZATION REACTORS

CROSS-REFERENCE TO RELATED APPLICATIONS

This application is a continuation application of U.S. patent application Ser. No. 13/682,336, filed Nov. 20, 2012, the disclosure of which is incorporated herein by reference.

BACKGROUND

1. Field of the Invention

The present invention relates generally to polyolefin production and, more specifically, to coupling and decoupling of polymerization reactors and downstream processing in a polyolefin production system.

2. Description of the Related Art

This section is intended to introduce the reader to aspects of art that may be related to aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

As chemical and petrochemical technologies have advanced, the products of these technologies have become increasingly prevalent in society. In particular, as techniques for bonding simple molecular building blocks into longer chains (or polymers) have advanced, the polymer products, typically in the form of various plastics, have been increasingly incorporated into everyday items. Polyolefin polymers such as polyethylene, polypropylene, and their copolymers, are used for piping, retail and pharmaceutical packaging, food and beverage packaging, plastic bags, toys, carpeting, various industrial products, automobile components, appliances and other household items, and so forth.

Specific types of polyolefins, such as high-density polyethylene (HDPE), have particular applications in the manufacture of blow-molded and injection-molded goods, such as food and beverage containers, film, and plastic pipe. Other types of polyolefins, such as low-density polyethylene (LDPE), linear low-density polyethylene (LLDPE), isotactic polypropylene (iPP), and syndiotactic polypropylene (sPP) are also suited for similar applications. The mechanical requirements of the application, such as tensile strength and density, and/or the chemical requirements, such thermal stability, molecular weight, and chemical reactivity, typically determine what type of polyolefin is suitable.

One benefit of polyolefin construction, as may be deduced from the list of uses above, is that it is generally non-reactive with goods or products with which it is in contact. This allows polyolefin products to be used in residential, commercial, and industrial contexts, including food and beverage storage and transportation, consumer electronics, agriculture, shipping, and vehicular construction. The wide variety of residential, commercial and industrial uses for polyolefins has translated into a substantial demand for raw polyolefin which can be extruded, injected, blown or otherwise formed into a final consumable product or component.

To satisfy this demand, various processes exist by which olefins may be polymerized to form polyolefins. These processes may be performed at or near petrochemical facilities, which provide ready access to the short-chain olefin molecules (monomers and comonomers), such as ethylene, propylene, butene, pentene, hexene, octene, decene, and other building blocks of the much longer polyolefin polymers. These monomers and comonomers may be polymerized in a liquid-phase polymerization reactor and/or gas-phase polymerization reactor. As polymer chains develop during polymerization in the reactor, solid particles known as "fluff" or "flake" or "powder" are produced in the reactor.

The fluff may possess one or more melt, physical, rheological, and/or mechanical properties of interest, such as density, melt index (MI), melt flow rate (MFR), comonomer content, molecular weight, crystallinity, and so on. Different properties for the fluff may be desirable depending on the application to which the polyolefin fluff or subsequently pelletized polyolefin is to be applied. Selection and control of the reaction conditions within the reactor, such as temperature, pressure, chemical concentrations, polymer production rate, catalyst type, and so forth, may affect the fluff properties.

In addition to the one or more olefin monomers, a catalyst (e.g., Ziegler-Natta, metallocene, chromium-based, etc.) for facilitating the polymerization of the monomers may be added to the reactor. For example, the catalyst may be a particle added via a reactor feed stream and, once added, suspended in the fluid medium within the reactor. Unlike the monomers, catalysts are generally not consumed in the polymerization reaction. Moreover, an inert hydrocarbon, such as isobutane, propane, n-pentane, i-pentane, neopentane, and/or n-hexane, may be added to the reactor and utilized as a diluent to carry the contents of the reactor. However, some polymerization processes may not employ a separate diluent, such as in the case of selected examples of polypropylene production where the propylene monomer itself acts as the diluent. In general, the diluent may facilitate circulation of the polymer slurry in the reactor, heat removal from the polymer slurry in the reactor, and so on.

The slurry discharge of the reactor typically includes the polymer fluff as well as non-polymer components such as unreacted olefin monomer (and comonomer), diluent, and so forth. This discharge stream is generally processed, such as by a diluent/monomer recovery system (e.g. flash vessel or separator vessel, purge column, etc.) to separate the non-polymer components from the polymer fluff. The recovered diluent, unreacted monomer, and other non-polymer components from the recovery system may be treated and recycled to the reactor, for example. As for the recovered polymer (solids), the polymer may be treated to deactivate residual catalyst, remove entrained or dissolved hydrocarbons, dry the polymer, and pelletize the polymer in an extruder, and so forth, before the polymer is sent to customer.

In some circumstances, to increase capacity of a polyolefin polymerization line or to achieve certain desired polymer characteristics, more than one polymerization reactor may be employed, with each reactor having its own set of conditions. For example, the respective reactor conditions including the polymerization recipe can be set and maintained such that the polyolefin (e.g., polyethylene, polypropylene) polymer product is monomodal, bimodal, or multimodal. In the case of bimodal or multimodal polymers, at least two polyolefin polymers (e.g., two polyethylene polymers or two polypropylene polymers), each having a different molecular weight fraction (and different density), for instance, may be combined into one polymer product. The reactors may be connected in series, such that the slurry from one reactor may be transferred to a subsequent reactor, and so forth, until a polyolefin polymer is produced discharging from the final reactor with the desired set of characteristics. For example, a bimodal polymer may be produced by two reactors in series, a trimodal polymer may need three, and so on. Further, the amount of polyolefin polymer produced in each reactor may be different, and thus contribute a different weight percentage to the polymer product.

The competitive business of polyolefin production drives manufacturers in the continuous improvement of their processes in order to lower production costs, improve product quality, increase operating flexibility and capability, expand product slate variety, expand product end-use and performance, and so on. In an industry where billions of pounds of polyolefins are produced per year, small incremental improvements, such as in product quality and variety can result in significant economic benefit, increased sales, larger market share, greater net-back, and so forth.

SUMMARY OF THE INVENTION

An aspect of the invention relates to a polyolefin production system including: a first reactor configured to produce a first reactor discharge comprising a first polyolefin; a second reactor configured to produce a second reactor discharge having a second polyolefin; and a post-reactor treatment zone configured to receive the first reactor discharge and the second reactor discharge, wherein the first and second reactors are configured to allow the first reactor discharge to be (a) transferred to the second reactor and, alternatively, (b) diverted to by-pass the second reactor and fed into the post-reactor treatment zone wherein the first and second polyolefins are first contacted in the post-reactor treatment zone.

Another aspect of the invention relates to a polyolefin production system including: a first-reactor configured to produce a first reactor discharge comprising polyolefin and non-polyolefin components; and a post-reactor treatment zone configured to receive the first reactor discharge and produce a first extruded polyolefin and a second extruded polyolefin.

Yet another aspect of the invention relates to a polyolefin production system including: a first reactor configured to produce a first discharge slurry having a first polyolefin; a second reactor configured to produce a second discharge slurry comprising a second polyolefin; and a post-reactor treatment zone comprising a separation vessel configured to receive as separate feeds the first discharge slurry and the second discharge slurry.

BRIEF DESCRIPTION OF THE DRAWINGS

Advantages of the invention may become apparent upon reading the following detailed description and upon reference to the drawings in which.

DETAILED DESCRIPTION OF SPECIFIC EMBODIMENTS

Figure 1:
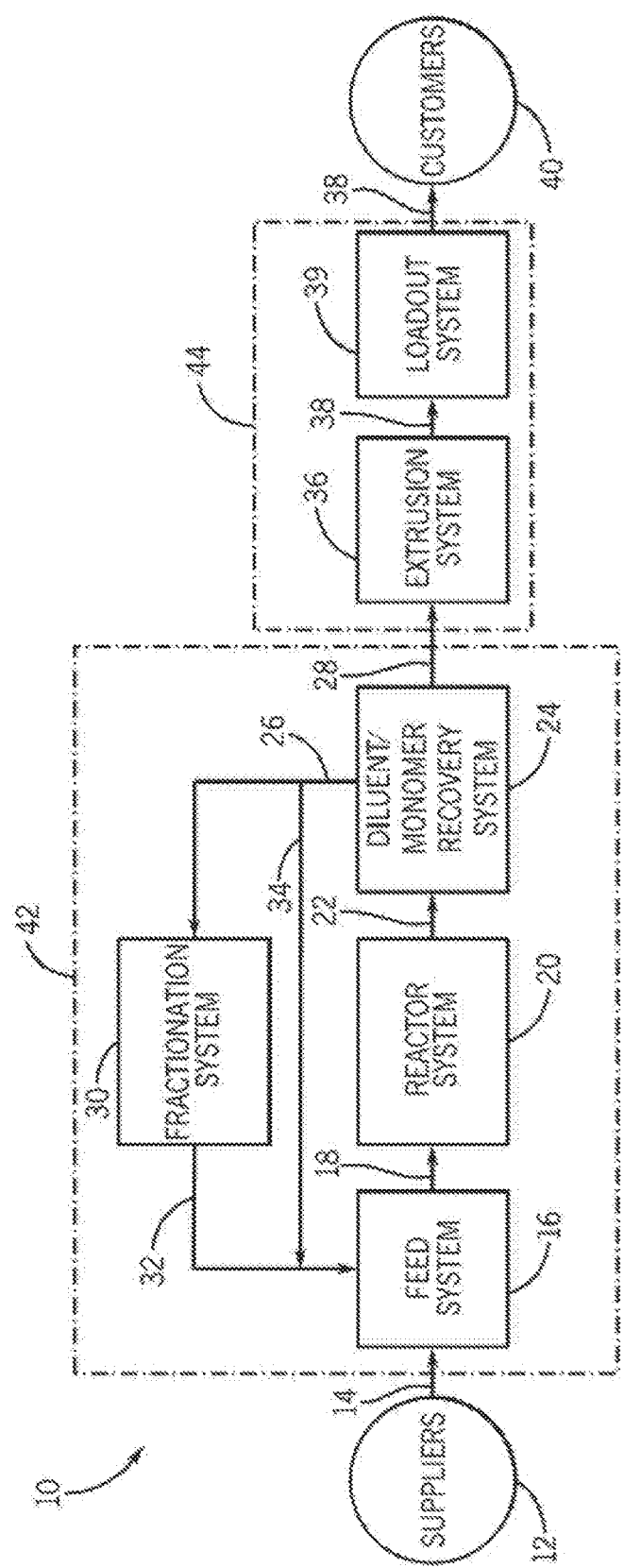
FIG. 1 is a block flow diagram depicting an exemplary polyolefin production system for producing polyolefin in accordance with embodiments of the present techniques.

One or more specific embodiments of the present invention will be described below. To provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill in the art and having the benefit of this disclosure.

Embodiments of the present techniques relate to uniquely increasing operating flexibility and polyolefin product slate capability. The polyolefin production system is configured with the capability to operate polymerization reactors in both series and parallel.

The series mode may be characterized as a coupled operation of the polymerization reactors in certain examples. The parallel mode may be characterized as a decoupled or independent operation of the polymerization reactors in examples. This capability to shift operation of a set of polymerization reactors between series operation and parallel operation may provide for flexibility in producing monomodal and multimodal (e.g., bimodal) polyolefin polymers, and also provide shutdown and maintenance flexibility, as discussed below.

Thus, embodiments of the present techniques relate to process improvements for a polyolefin plant to give product type flexibility. In certain embodiments, at least two slurry loop reactors are run in series and then decoupled to run in parallel or decoupled with one reactor run while the other reactor is down for maintenance. This gives the plant flexibility to run bimodal products and switch to single reactor products for varying markets conditions. The parallel reactors could run on separate parallel lines or combined after the reactor discharge streams.

The post-reactor treatment zone in the polyolefin production system may be configured with the capability to receive: (1) product polyolefin slurries discharged from polymerization reactors operating in parallel mode; and also (2) the product polyolefin slurry from the terminal or final reactor in a set of polymerization reactors operating in series mode. The post-reactor treatment zone may contact, combine, and blend any plurality of product polyolefin slurries received. In other words, in cases of the post-reactor treatment zone receiving more than one product polyolefin slurry, the product polyolefin slurries may meet or come into contact and combine in the post-reactor treatment zone, and me blended in an extruder (e.g., in the flowing melt in the extruder) of the post-reactor treatment zone, for example.

In addition to combining polyolefin slurries, the increased operating and product flexibility in the polyolefin production system may involve splitting, dividing, and diverting polyolefin slurry and/or polyolefin solids streams. For example, the polyolefin product slurry discharged from a polymerization reactor may be diverted or split into two streams. In other examples, polyolefin solids streams in the post-reactor treatment zone may be diverted or split into two streams.

As discussed below, the post-reactor treatment zone may include a monomer/diluent recovery system that removes hydrocarbons from the polyolefins product slurry discharged from the polymerization reactor(s), and an extrusion system that pelletizes the treated polyolefin product from the monomer/diluent recovery system. Moreover, the post-reactor treatment zone may include a fractionation system that purifies the hydrocarbon (e.g., diluent, monomer) recovered in the monomer/diluent recovery system.

Again, the present techniques provide flexibility. Reactors can be run in series to produce bimodal or monomodal resins. Reactors can be run in parallel and produce the same or different products. The reactor produce can be blended, separated, sold as fluff or pellets. Series reactor designs are sometimes limited in the ability to produce a wide range of products. This could be important with large plant capacities since a market might not be able to take primarily bimodal types. Decoupling the reactors might also give the plant flexibility to produce higher margin products and greater throughput. This could improve plant economics.

In certain embodiments, a polyolefin plant can run in series mode with at least two loop slurry reactors, and with the following configurations and operational flexibility: (1) the production from the downstream reactor feeds one separation operation (cyclone, flash tank, etc.); (2) the production from the downstream reactor is split and feeds parallel lines (cyclone, flash tank, purge column, extruder, etc.); and (3) the production from the downstream reactor is split at the extruder and the two parallel extruders run at different conditions (additives, crosslinking) or similar conditions.

Moreover, embodiments provide that the series reactors can be operationally decoupled and run in parallel (or decouple and one of the reactors is shut down for maintenance): (1) the production from parallel reactors is combined downstream in the separations (flash) operation, the purge column, or extruder; or (2) the production from the parallel reactors is sent to parallel lines (cyclone, flash vessel, purge column, extruder, etc.). Further, the parallel reactors may be switched to series operation, and the reactors combined by a continuous transfer of slurry from the one reactor to the other reactor.

In addition, the present techniques may be beneficial in operating adjacent polyolefin production lines. In some examples, the present techniques may provide for retrofit of an existing installation. For instance, existing adjacent polyolefin lines each having a single polymerization (loop) reactor may be retrofitted to provide for the present flexibility to operate two reactors in parallel and series modes, and thus to facilitating ease of monomodal and bimodal production, for example. Lastly, while not depicted in the figures, a fluff slurry processing system may be disposed between two reactors in series. In certain examples, the fluff slurry processing system removes light components from the transfer slurry discharging from the first reactor to the second reactor.

I. Polyolefin Production Overview

Turning now to the drawings, and referring initially to FIG. 1, a block diagram depicts an exemplary production system 10 for producing polyolefin such as polyethylene, polypropylene, and their copolymers, etc. The exemplary production system 10 is typically a continuous operation but may include both continuous and batch systems. An exemplary nominal capacity for the exemplary production system 10 is about 700-1600 million pounds of polyolefin produced per year. Exemplary hourly design rates are approximately 70,000 to 200,000 pounds of polymerized/extruded polyolefin per hour. It should be emphasized, however, that the present techniques apply to polyolefin manufacturing processes including polyethylene production systems having nominal capacities and design rates outside of these exemplary ranges.

Various suppliers 12 may provide reactor feedstocks 14 to the production system 10 via pipelines, ships, trucks, cylinders, drums, and so forth. The suppliers 12 may include off-site and/or on-site facilities, including olefin plants, refineries, catalyst plants, and the like. Examples of possible feedstocks include olefin monomers and comonomers (such as ethylene, propylene, butene, hexene, octene, and decene), diluents (such as propane, isobutane, n-butane, n-hexane, and n-heptane), chain transfer agents (such as hydrogen), catalysts (such as Ziegler-Natta catalysts, chromium catalysts, and metallocene catalysts) which may be heterogeneous, homogenous, supported, unsupported, and co-catalysts such as, triethylboron, organoaluminum compounds, methyl aluminoxane, triethylaluminum, borates, triisobutylaluminum, etc., and activators such as solid super acids, and other additives. In the case of ethylene monomer, exemplary ethylene feedstock may be supplied via pipeline at approximately 800-1450 pounds per square inch gauge (psig) at 45-65.degree. F. Exemplary hydrogen feedstock may also be supplied via pipeline, but at approximately 900-1000 psig at 90-110.degree. F. Of course, a variety of supply conditions may exist for ethylene, hydrogen, and other feedstocks 14.

The suppliers 12 typically provide feedstocks 14 to a reactor feed system 16, where the feedstocks 14 may be stored, such as in monomer storage and feed tanks, diluent vessels, catalyst tanks, co-catalyst cylinders and tanks, and so forth. In the case of ethylene monomer feed, the ethylene may be fed to the polymerization reactors without intermediate storage in the feed system 16 in certain embodiments. In the feed system 16, the feedstocks 14 may be treated or processed prior to their introduction as feed 18 into the polymerization reactor system. For example, feedstocks 14, such as monomer, comonomer, and diluent, may be sent through treatment beds (e.g., molecular sieve beds, aluminum packing, etc.) to remove catalyst poisons. Such catalyst poisons may include, for example, water, oxygen, carbon monoxide, carbon dioxide, and organic compounds containing sulfur, oxygen, or halogens. The olefin monomer and comonomers may be liquid, gaseous, or a supercritical fluid, depending on the type of reactor being fed. Also, it should be noted that typically only a relatively small amount of fresh make-up diluent as feedstock 14 is utilized, with a majority of the diluent fed to the polymerization reactor recovered from the reactor effluent.

The feed system 16 may prepare or condition other feedstocks 14, such as catalysts, for addition to the polymerization reactors. For example, a catalyst may be prepared and then mixed with diluent (e.g., isobutane or hexane) or mineral oil in catalyst preparation tanks. Further, the feed system 16 typically provides for metering and controlling the addition rate of the feedstocks 14 into the polymerization reactor to maintain the desired reactor stability and/or to achieve the desired polyolefin properties or production rate. Furthermore, in operation, the feed system 16 may also store, treat, and meter recovered reactor effluent for recycle to the reactor. Indeed, operations in the feed system 16 generally receive both feedstock 14 and recovered reactor effluent streams.

In total, the feedstocks 14 and recovered reactor effluent are processed in the feed system 16 and fed as feed streams 18 (e.g., streams of monomer, comonomer, diluent, catalysts, co-catalysts, hydrogen, additives, or combinations thereof) to the reactor system 20. As discussed below, the streams 18 may be delivered in feed conduits to the reactor which tap into the wall of the polymerization reactor in the reactor system 20. Moreover, a given feed system 16 may be dedicated to a particular reactor or to multiple reactors disposed/operated in series or parallel. Further, a feed system 16 may receive recycle components (e.g., diluent) from one or more downstream processing systems.

The reactor system 20 may have one or more reactor vessels, such as liquid-phase or gas-phase reactors. If multiple reactors are employed, the reactors may be arranged in series, in parallel, or in other combinations or configurations. As discussed below, multiple reactors arranged and operated in series may be shifted in operation to a parallel or independent operation.

In the polymerization reactor vessels, one or more olefin monomers and optionally comonomers are polymerized to form a product polymer particulates, typically called fluff or granules. In one example, the monomer is ethylene and the comonomer is 1-hexene. In another example, the monomer is propylene and the comonomer is ethylene. The fluff may possess one or more melt, physical, rheological, and/or mechanical properties of interest, such as density, melt index (MI), molecular weight, copolymer or comonomer content, modulus, and the like. The reaction conditions, such as temperature, pressure, flow rate, mechanical agitation, product takeoff, component concentrations, catalyst type, polymer production rate, and so forth, may be conduit that taps into the wall of the polymerization reactor. Further, diluent may be fed into the reactor, typically a liquid-phase reactor.

The diluent may be an inert hydrocarbon that is liquid at reaction conditions, such as isobutane, propane, n-butane, n-pentane, i-pentane, neopentane, n-hexane, cyclohexane, cyclopentane, methylcyclopentane, ethylcyclohexane, and the like. The purpose of the diluent is generally to suspend the catalyst particles and polymer within the reactor. Diluent, as indicated, may also be used for reactor or line flushes to mitigate plugging or fouling, to facilitate flow of the polymer slurry in lines, and so on. Moreover, in examples of polypropylene production, the propylene monomer itself may act as a diluent.

A motive device may be present within each of the one or more reactors in the reactor system 20. For example, within a liquid-phase reactor, such as a loop slurry reactor, an impeller may create a mixing zone within the fluid medium. The impeller may be driven by a motor to propel the fluid medium as well as any catalyst, polyolefin fluff, or other solid particulates suspended within the fluid medium, through the closed loop of the reactor. Similarly, within a gas-phase reactor, such as a fluidized bed reactor or plug flow reactor, one or more paddles or stirrers may be used to mix the solid particles within the reactor.

The discharge of polyolefin fluff product slurry 22 of the reactors from system 20 may include the polymer polyolefin fluff as well as non-polymer components, such as diluent, unreacted monomer/comonomer, and residual catalyst. In construction of the reactors in certain embodiments, a discharge nozzle and conduit may be installed (e.g., welded) at a tap or hole cut into the reactor wall. The discharge of the fluff product slurry 22 exiting the reactor (e.g., the final reactor in a series of reactors) through the discharge nozzle may be subsequently processed, such as by a diluent/monomer recovery system 24. The fluff product slurry 22 may also be called a reactor product discharge slurry, a reactor product discharge, or a reactor discharge, etc. Thus, depending on context, a "reactor discharge" may refer to the fluff slurry exiting the reactor and/or to the physical configuration (e.g., reactor wall tap or opening, nozzle, conduit, valve if any, etc.) discharging the fluff slurry.

Furthermore, it should be noted that the liquid (e.g., diluent) in fluff product slurry 22 generally partially or fully vaporizes through a flash line including a flash line heater (not shown) downstream of the reactor in route to the diluent/monomer recovery system 24. As discussed below, such vaporization may be due to decreasing pressure through the flash line, and due to heat added by the flash line heater (e.g., a conduit with a steam or steam condensate jacket). In other words, in embodiments the flash line and its heater are configured to volatize diluent, and to increase enthalpy of the fluff product slurry 22. Moreover, the flash line and flash line heater may be defined as: (1) part of the reactor system; (2) disposed between the reactor system and the diluent/monomer recovery system 24; or (3) part of the diluent/monomer recovery system 24. In certain embodiments, the flash line heater is defined as intermediate (disposed between) the reactor system 20 and the diluent/monomer recovery system 24, and with the post-reactor treatment zone not including the flash line and flash line heater but beginning with the first vessel in the recovery system 24.

Nevertheless, the diluent/monomer recovery system 24 may process the fluff product slurry 22 (whether the liquid in the slurry 22 is partially or fully vaporized in the flash line) from the reactor system 20 to separate non-polymer components 26 (e.g., diluent and unreacted monomer) from the polymer fluff 28. Moreover, as also discussed below, a diluent/monomer recovery system 24 may receive a fluff product slurry discharge 22 from one or more reactors in the reactor system 20.

A fractionation system 30 may process the untreated recovered non-polymer components 26 (e.g., diluent/monomer) to remove undesirable heavy and light components and to produce olefin-free diluent, for example. Fractionated product streams 32 may then return to the reactor system 20 either directly (not shown) or via the feed system 16. Such olefin-free diluent may be employed in catalyst preparation/delivery in the feed system 16 and as reactor or line flushes in the reactor system 20.

A portion or all of the non-polymer components 26 may bypass the fractionation system 30 and more directly recycle to the reactor system (not shown) or the feed system 16, as indicated by reference numeral 34. In certain embodiments, up to 80-95% of the diluent discharged from the reactor system 20 bypasses the fractionation system 30 in route to the polymerization feed system 16 (and ultimately the reactor system 20). Moreover, although not illustrated, polymer granules intermediate in the recovery system 24 and typically containing active residual catalyst may be returned to the reactor system 20 for further polymerization, such as in a different type of reactor or under different reaction conditions The polyolefin fluff 28 discharging from the diluent/monomer recovery system 24 may be extruded into polyolefin pellets 38 in an extrusion system 36. In the extrusion system 36, the fluff 28 is typically extruded to produce polymer pellets 38 with the desired mechanical, physical, and melt characteristics. An extruder/pelletizer receives the extruder feed including one or more fluff products 28 and whatever additives have been added. Extruder feed may include additives added to the fluff products 28 to impart desired characteristics to the extruded polymer pellets 38. The extruder/pelletizer heats and melts the extruder feed which then may be extruded (e.g. via a twin screw extruder) through a pelletizer die under pressure to form polyolefin pellets 38. Such pellets are typically cooled in a water system disposed at or near the discharge of the pelletizer.

Additives added to the extruder feed (e.g., added at the inlet piping or inlet equipment of the extruder) or added at the extruder (e.g., injected into the melt channel of the extruder) may include surface modifiers (e.g., slip agents, antiblocks, tackifers), UV inhibitors, antioxidants (e.g., phenolics, phosphites, thioesters, amines, etc.), colorants, pigments, processing aids (e.g., flow promoters such as waxes & oils and fluoroelastomers), peroxides, and other additives. The different additives may be combined into an additive package for addition, as appreciated by the skilled artisan. Furthermore, as may be deduced from the variety of additives listed above and as discussed below with respect to FIGS. 14-15C in accordance with the present techniques, it may be beneficial to combine or divert incoming parallel fluff 28 feeds from upstream recovery system(s) 24 and match different additive packages with the fluff feeds, such as via one or more extruder feed tanks and extruders.

Nevertheless, one or more loadout systems 39 may prepare the polyolefin pellets 38 for shipment in to customers 40. In general, the polyolefin pellets 38 may be transported from the extrusion system 36 to a product loadout area 39 where the pellets 38 may be stored, blended with other pellets, and/or loaded into railcars, trucks, bags, and so forth, for distribution to customers 40. Polyolefin pellets 38 shipped to customers 40 may include low density polyethylene (LDPE), linear low density polyethylene (LLDPE), medium density polyethylene (MDPE), high density polyethylene (HDPE), enhanced polyethylene, isotactic polypropylene (iPP), syndiotactic polypropylene (sPP), including various copolymers, and so on. The polymerization and diluent recovery portions of the polyolefin production system 10 may be called the "wet" end 42 or alternatively "reaction" side of the process 10. The extrusion 36 and loadout 39 systems of the polyolefin production system 10 may be called the "dry" end 44 or alternatively "finishing" side of the polyolefin process 10. Moreover, while the polyolefin pellets 38 discharging from the extrusion system 36 may be stored and blended in the loadout area 39, the polyolefin pellets 38 are generally not altered by the loadout system 39 prior to being sent to the customer 40.

Polyolefin pellets 38 may be used in the manufacturing of a variety of products, components, household items and other items, including adhesives (e.g., hot-melt adhesive applications), electrical wire and cable, agricultural films, shrink film, stretch film, food packaging films, flexible food packaging, milk containers, frozen-food packaging, trash and can liners, grocery bags, heavy-duty sacks, plastic bottles, safety equipment, carpeting, coatings, toys and an array of containers and plastic products. To form the end-products or components, the pellets 38 are generally subjected to processing, such as blow molding, injection molding, rotational molding, blown film, cast film, extrusion (e.g., sheet extrusion, pipe and corrugated extrusion, coating/lamination extrusion, etc.), and so on. Ultimately, the products and components formed from polyolefin pellets 38 may be further processed and assembled for distribution and sale to the consumer. For example, extruded pipe or film may be packaged for distribution to the customer, or a fuel tank comprising polyethylene may be assembled into an automobile for distribution and sale to the consumer, and so on.

Polyolefin pellets 38 may be used in the manufacturing of a variety of products, components, household items and other items, including adhesives (e.g., hot-melt adhesive applications), electrical wire and cable, agricultural films, shrink film, stretch film, food packaging films, flexible food packaging, milk containers, frozen-food packaging, trash and can liners, grocery bags, heavy-duty sacks, plastic bottles, safety equipment, carpeting, coatings, toys and an array of containers and plastic products. To form the end-products or components, the pellets 38 are generally subjected to processing, such as blow molding, injection molding, rotational molding, blown film, cast film, extrusion (e.g., sheet extrusion, pipe and corrugated extrusion, coating/lamination extrusion, etc.), and so on. Ultimately, the products and components formed from polyolefin pellets 38 may be further processed and assembled for distribution and sale to the consumer. For example, extruded pipe or film may be packaged for distribution to the customer, or a fuel tank comprising polyethylene may be assembled into an automobile for distribution and sale to the consumer, and so on.

Process variables in the polyolefin production system 10 may be controlled automatically and/or manually via valve configurations, control systems, and so on. In general, a control system, such as a processor-based system, may facilitate management of a range of operations in the polyolefin production system 10, such as those represented in FIG. 1. Polyolefin manufacturing facilities may include a central control room or location, as well as a central control system, such as a distributed control system (DCS) and/or programmable logic controller (PIC). Of course, the reactor system 20 typically employs a processor-based system, such as a DCS, and may also employ advanced process control known in the art. The feed system 16, diluent/monomer recovery 24, and fractionation system 30 may also be controlled by the DCS. In the dry end of the plant, the extruder and/or pellet loading operations may also be controlled via a processor-based system (e.g., DCS or PLC). Moreover, in the controls systems, computer-readable media may store control executable code to be executed by associated processors including central processing units, and the like. Such code executable by the processor may include logic to facilitate the coupling and decoupling operations described herein.

Indeed, the DCS and associated control system(s) in the polyolefin production system 10 may include the appropriate hardware, software logic and code, to interface with the various process equipment, control valves, conduits, instrumentation, etc., to facilitate measurement and control of process variables, to implement control schemes, to perform calculations, and so on. A variety of instrumentation known to those of ordinary skill in the art may be provided to measure process variables, such as pressure, temperature, flow rate, and so on, and to transmit a signal to the control system, where the measured data may be read by an operator and/or used as an input in various control functions. Depending on the application and other factors, indication of the process variables may be read locally or remotely by an operator, and used for a variety of control purposes via the control system.

A polyolefin manufacturing facility typically has a control room from which the plant manager, engineer, technician, supervisor and/or operator, and so on, monitors and controls the process. When using a DCS, the control room may be the center of activity, facilitating the effective monitoring and control of the process or facility. The control room and DCS may contain a Human Machine Interface (HMI), which is a computer, for example, that runs specialized software to provide a user-interface for the control system. The H-IMI may vary by vendor and present the user with a graphical version of the remote process.

There may be multiple HMI consoles or workstations, with varying degrees of access to data.

II. Polymerization Reactor System

As discussed above, the reactor system 20 may include one or more polymerization reactors, which may in turn be of the same or different types. Furthermore, with multiple reactors, the reactors may be arranged serially or in parallel. Whatever the reactor types in the reactor system 20, a polyolefin particulate product, generically referred to as "fluff" herein, is produced. To facilitate explanation, the following examples are limited in scope to specific reactor types believed to be familiar to those skilled in the art and to combinations. To one of ordinary skill in the art using this disclosure, however, the present techniques are applicable to more complex reactor arrangements, such as those involving additional reactors, different reactor types, and/or alternative ordering of the reactors or reactor types, as well as various diluent and monomer recovery systems and equipment disposed between or among the reactors, and so on. Such arrangements are considered to be well within the scope of the present invention.

One reactor type include reactors within which polymerization occurs within a liquid phase. Examples of such liquid phase reactors include autoclaves, boiling liquid-pool reactors, loop slurry reactors (vertical or horizontal), and so forth. For simplicity, a loop slurry reactor which produces polyolefin, such as polyethylene or polypropylene, is discussed in the present context though it is to be understood that the present techniques may be similarly applicable to other types of liquid phase reactors.

Figure 2:
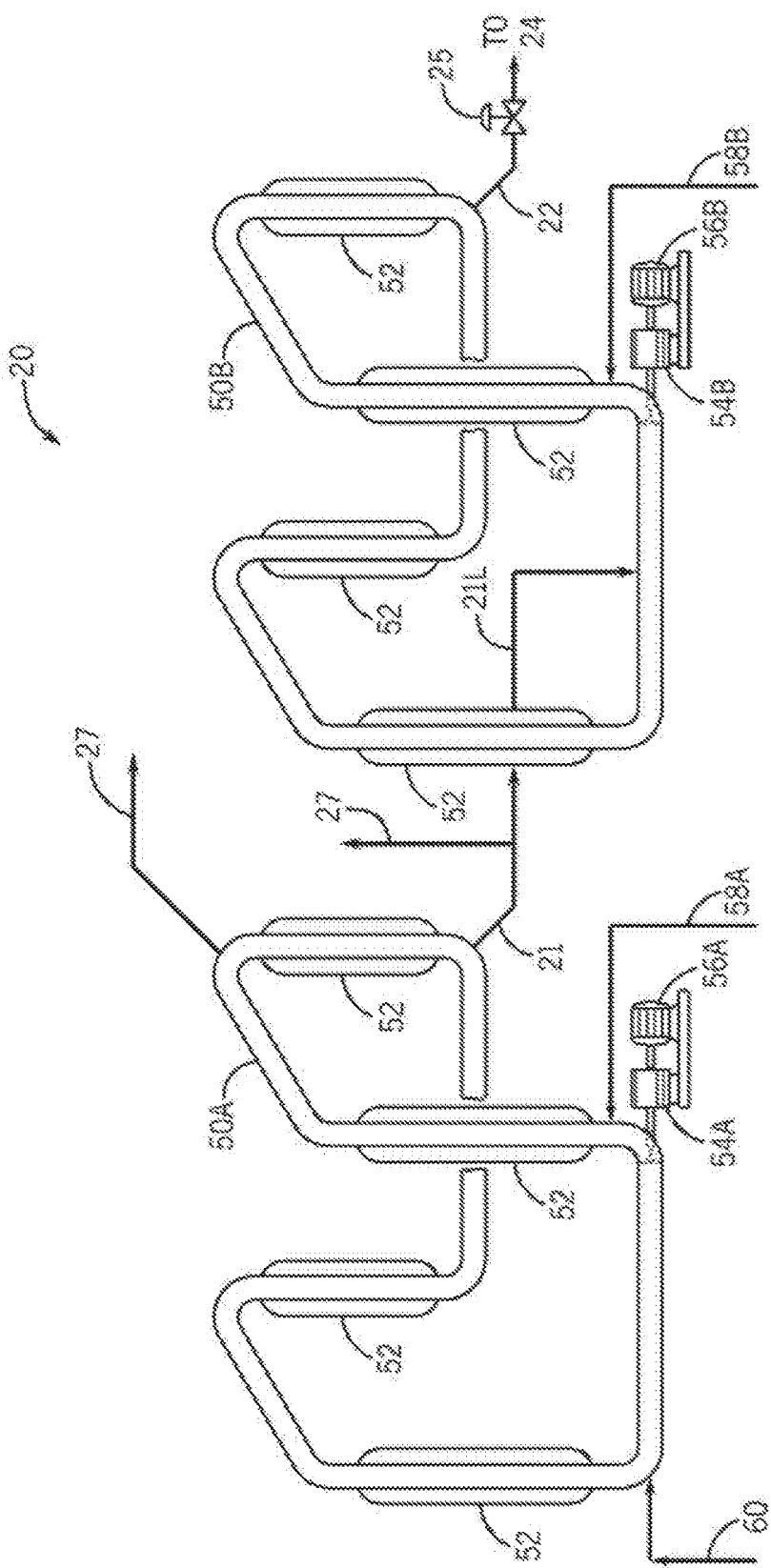
FIG. 2 is a process flow diagram of an exemplary reactor system of the polyolefin production system of FIG. 1 in accordance with embodiments of the present techniques.

FIG. 2 depicts an exemplary polymerization reactor system 20 (of FIG. 1) as having two loop slurry (polymerization) reactors 50A, 50B disposed and operated in series. Of course, additional loop reactors or other reactors (e.g., gas phase reactors) may be disposed in series or parallel in the illustrated combination. Moreover, in embodiments, the reactors 50A, 50B may be shifted to a parallel operation, and/or processing equipment may be disposed between the two loop reactors 50A, 50B (see FIG. 13 and FIG. 14, for example), and so on, providing additional operating and product flexibility. Indeed, the present techniques contemplate a variety of reactor system configurations such as those also disclosed in U.S. Patent Application Publication No. 2011/0288247 which is incorporated by reference herein in its entirety.

A loop slurry reactor 50A, 50B is generally composed of segments of pipe connected by smooth bends or elbows. The representation of the loop reactors 50A, 50B in FIG. 2 is simplified, as appreciated by the skilled artisan. Indeed, an exemplary reactor 50A, 50B configuration may include eight to sixteen or other number of jacketed vertical pipe legs, approximately 24 inches in diameter and approximately 200 feet in length, connected by pipe elbows at the top and bottom of the legs. FIG. 2 shows a four leg segment reactor arranged vertically. It could also be arranged horizontally. The reactor jackets 52 are normally provided to remove heat from the exothermic polymerization via circulation of a cooling medium, such as treated water, through the reactor jackets 52.

The reactors 50A, 50B may be used to carry out polyolefin (e.g., polyethylene, polypropylene) polymerization under slurry conditions in which insoluble particles of polyolefin are formed in a fluid medium and are suspended as slurry until removed. A respective motive device, such as pump 54A, 54B, circulates the fluid slurry in each reactor 50A, 50B. An example of a pump 54A, 54B is an in-line axial flow pump with the pump impeller disposed within the interior of the reactor 50A, 50B to create a turbulent mixing zone within the fluid medium. The impeller may also assist in propelling the fluid medium through the closed loop of the reactor at sufficient speed to keep solid particulates, such as the catalyst or polyolefin product, suspended within the fluid medium. The impeller may be driven by a motor 56A, 56B or other motive force.

The fluid medium within each reactor 50A, 50B may include olefin monomers and comonomers, diluent, co-catalysts (e.g., alkyls such as triethylaluminum and triisobutylaluminum, borates, triethylboron, methyl aluminoxane, etc.), activator supports like solid super acids, molecular-weight control agents (e.g., hydrogen), and any other desired co-reactants or additives. Such olefin monomers and comonomers are generally 1-olefins having up to 10 carbon atoms per molecule and typically no branching nearer the double bond than the 4-position. Examples of monomers and comonomers include ethylene, propylene, butene, 1-pentene, 1-hexene, 1-octene, and 1-decene. Again, typical diluents are hydrocarbons which are inert and liquid under reaction conditions, and include, for example, isobutane, propane, n-butane, n-pentane, i-pentane, neopentane, n-hexane, cyclohexane, cyclopentane, methylcyclopentane, ethylcyclohexane, and the like. These components are added to the reactor interior via inlets or conduits at specified locations, such as depicted at feed streams 58A, 58B, which generally corresponds to one of the feed streams 18 of FIG. 1.

Likewise, a catalyst, such as those previously discussed, may be added to the reactor 50A via a conduit at a suitable location, such as depicted at feed stream 60, which may include a diluent carrier and which also generally corresponds to one of the feed streams 18 of FIG. 1. Again, the conduits that feed the various components tie-in (i.e., flange or weld) to the reactor 50. In the illustrated embodiment, catalyst feed 60 is added to the first reactor 50A in series but not to the second reactor 50B. However, active catalyst may discharge in a fluff slurry 21 from the first reactor 50A to the second reactor 50B. Moreover, while not depicted, a fresh catalyst may be added to the second reactor 50B in certain embodiments. In total, the added components including the catalyst and other feed components generally compose a fluid medium within the reactor 50A, 50B in which the catalyst is a suspended particle.

The reaction conditions, such as temperature, pressure, and reactant concentrations, in each reactor 50A, 50B are regulated to facilitate the desired properties and production rate of the polyolefin in the reactor, to control stability of the reactor, and the like. Temperature is typically maintained below that level at which the polymer product would go into solution, swell, soften, or become sticky. As indicated, due to the exothermic nature of the polymerization reaction, a cooling fluid may be circulated through jackets 52 around portions of the loop slurry reactor 50A, 50B to remove excess heat, thereby maintaining the temperature within the desired range, generally between 150.degree. F. to 250.degree. F. (65.degree. C. to 121.degree. C.). Likewise, pressure in each loop reactor 50A, 50B may be regulated within a desired pressure range, generally 100 to 800 psig, with a range of 450-700 psig being typical.

As the polymerization reaction proceeds within each reactor 50A, 50B, the monomer (e.g., ethylene) and comonomers (e.g., 1-hexene) polymerize to form polyolefin (e.g., polyethylene) polymers that are substantially insoluble in the fluid medium at the reaction temperature, thereby forming a slurry of solid particulates within the medium. These solid polyolefin particulates may be removed from each reactor 50A, 50B via a settling leg or other means, or a continuous take-off (CTO), and so on.

As mentioned, FIG. 2 depicts two loop reactors 50A, 50B in series. The two loop reactors 50A, 50B may be operated such that the polyethylene fluff in the fluff slurry 22 discharging from the second reactor 50B is monomodal or bimodal. In certain cases of monomodal production, the reactor operating conditions may be set such that essentially the same polyolefin or similar polyolefin is polymerized in each reactor 50A, 50B. On the other hand, in the case of bimodal production, the reactor operating conditions may be set such that the polyolefin polymerized in the first reactor 50A is different than the polyolefin polymerized in the second reactor 50B. Thus, with two reactors, a first polyolefin produced in the first loop reactor 50A and the second polyolefin produced in the second loop reactor 50B may combine to give a bimodal polyolefin or a monomodal polyolefin.

Operation of the two loop reactors 50A, 50B may include feeding more comonomer to the first polymerization reactor than to the second polymerization reactor, or vice versa. The operation may also include feeding more hydrogen to the second polymerization reactor than the second reactor, or vice versa. Of course the same amount of comonomer and/or the same amount of hydrogen may be fed to each reactor 50A, 50B.

Further, the same or different comonomer concentration may be maintained in each reactor 50. Likewise, the same or different hydrogen concentration may be maintained in each reactor 50A, 50B. Furthermore, the first polyolefin (i.e., polyolefin polymerized in the first reactor 50A) may have a first range for a physical property, and the second polyolefin (i.e., polyolefin polymerized in the second reactor 50B) may have a second range for the physical property. The first range and the second range may be the same or different. Exemplary physical properties include polyolefin density, comonomer percentage, short chain branching amount, molecular weight, viscosity, melt index, melt flow rate, crystallinity, and the like.

Moreover, a differing amount of polyolefin may be produced in each loop reactor 50A, 50B. For example, the first polyolefin produced in the first reactor 50A may be 30 weight % to 70 weight % of the polyolefin product discharging in the product fluff slurry 22 from the second reactor 50B. Likewise, in examples, the second polyolefin produced in the second reactor 50B may be 30 weight % to 70 weight % of the polyolefin product discharging in the product fluff slurry 22 from the second reactor 50B. The different amount of polyolefin production in each reactor 50A, 50B may be accommodated in loop reactors 50A, 50B of similar or different size, with different operating conditions, and so on.

As indicated, the polyethylene product fluff slurry 22 discharges from the second reactor 50B and is subjected to downstream processing, such as in a diluent/monomer recovery system 24 (see FIGS. 1 and 9-11, for example). The product fluff slurry 22 may discharge through a settling leg, a continuous take-off (CTO), or other valve configurations.

The product fluff slurry 22 may discharge intermittently such as through a settling leg configuration, or instead may discharge continuously.

A variety of discharge configurations are contemplated for a continuous discharge. Employment of an isolation valve (e.g., full-bore Ram valve) without an accompanying modulating valve may provide for continuous discharge of slurry from the loop reactor. Further, a CTO is defined as a continuous discharge having at least a modulating flow valve, and provides for a continuous discharge of slurry from the loop reactor. In certain examples, a CTO is defined as a continuous discharge having an isolation valve (e.g., Ram valve) at the reactor wall and a modulating valve (e.g., v-ball valve) on the discharge conduit at the reactor. A Ram valve in a closed position may beneficially provide a surface that is flush with the inner wall of the reactor to preclude the presence of a cavity, space, or void for polymer to collect when the Ram valve is in the closed position.

In operation, depending on the positioning of the discharge on the reactor, for example, a discharge slurry 22 having a greater solids concentration than the slurry circulating in the reactor 50B may be realized with a discharge configuration having an isolation valve (Ram valve) alone, or having a CTO configuration with an isolation valve (Ram valve) and modulating valve 25. Exemplary CTO configurations and control, and other discharge configurations, may be found in the aforementioned U.S. Patent Application Publication No. 2011/0288247, and in U.S. Pat. No. 6,239,235 which is also incorporated herein by reference in its entirety.

In the illustrated embodiment, the product fluff slurry 22 discharges through a CTO. In certain examples, a CTO has a Ram valve at the reactor 50B wall, and a modulating flow control valve 25 (e.g., v-ball control valve) on the discharge conduit. Again, however, in an alternate embodiment, the product fluff slurry 22 may discharge through a settling leg configuration, for example, in lieu of a CTO.

A transfer fluff slurry 21 discharges from the first loop reactor 50A to the second loop reactor 50B via a transfer line 21L. The contents of transfer fluff slurry 21 may be representative of the contents of the first loop reactor 50A. However, the solids concentration may be greater in the transfer slurry 21 than in the first loop reactor 50A, depending on the positioning of the inlet of the transfer line 21L on the first loop reactor 50A, for example, and other considerations. The transfer fluff slurry 21 may discharge from the first loop reactor 50A into the transfer line 21L through a settling leg, an isolation valve (e.g., a Ram valve), a continuous take-off (which as indicated the CTO has an isolation or Ram valve and a modulating valve), or other valve configuration.

In the illustrated embodiment, the discharge of the transfer slurry 21 from the first loop reactor 50A is continuous and not directly modulated. A CTO or settling leg is not employed. Instead, the transfer slurry 21 discharges through an isolation valve or Ram valve (not shown) on the transfer line 21L at the reactor wall and without a modulating valve in this example. In a particular example, the transfer slurry 21 discharges through a full-bore Ram valve maintained in a full-open position, and not additionally through a modulating valve. In alternate embodiments (not illustrated) a modulating valve may be disposed downstream on the transfer line 21L or a CTO with its modulating valve may be situated at the transfer slurry 21 discharge of the first reactor 50A. If so included, the modulating valve may control flow rate of the transfer slurry 21 and facilitate control of pressure in the first loop reactor 50A.

Nevertheless, in the various embodiments, an isolation (e.g., Ram) valve is typically disposed on the discharge at the wall of the first loop reactor 50A. The Ram valve may provide for isolation of the transfer line 21L from the loop reactor 50A when such isolation is desired. A Ram valve may also be positioned at the outlet of the transfer line 21L at the wall of the second loop reactor 50B to provide for isolation of the transfer line 21L from the second loop reactor 50B when such isolation is desired. It may be desired to isolate the transfer line 21L from the first and second loop reactors 50A, 50B during maintenance or downtime of the reactor system 20, or when an alternate discharge or transfer line from the first reactor 50A is placed in service, and so on. The operation or control of the Ram valves may be manual, hydraulic-assisted, air-assisted, remote, automated, and so on. The transfer line 21L may be manually removed from service (e.g., manually closing the Ram valves) or automatically removed (e.g., via a control system automatically closing the Ram valves) from service.

In the illustrated embodiment, control of pressure (and throughput) in the first loop reactor 50A and the second loop reactor 50B may be facilitated by operation of the CTO flow control valve 25. In some examples, the pressure in the first loop reactor 50A may float on the pressure in the second loop reactor 50B. The reactors 50A, 50B may be maintained at the same, similar, or different pressure. Pressure elements or instruments may be disposed on the reactors 50A, 50B and on the transfer line 21L Further, other process variable elements or instruments indicating temperature, flow rate, slurry density, and so forth, may also be so disposed.

Such instrumentation may include a sensor or sensing element, a transmitter, and so forth. For a pressure element, the sensing element may include a diaphragm, for example. For a temperature element or instrument, the sensing element may include a thermocouple, a resistance temperature detector (RTD), and the like, of which may be housed in a thermowell, for instance. Transmitters may convert a received analog signal from the sensing element to a digital signal for feed or transmission to a control system, for example.

Of course the various instruments may have local indication of the sense variable. For instance, a pressure element or instrument may be or have a local pressure gauge and a temperature element or instrument may be or have a local temperature gauge, both of which may be read locally by an operator or engineer, for example.

The inlet position of the transfer line 21L may couple to the first loop reactor 50A on the discharge side of the circulation pump 56A in the first loop reactor 50A. The outlet position of the transfer line 21L may couple to the second loop reactor on the suction side of the circulation pump 56B in the second loop reactor 50B. Such a configuration may provide a positive pressure differential (i.e., a driving force) for flow of transfer slurry 21 through the transfer line 21L from the first loop reactor 50A to the second loop reactor 50B. In one example, a typical pressure differential (provided from the discharge of the first pump 54A to the suction of the second pump 54B) is about 20 pounds per square inch (psi).

Lastly, as discussed below, the present techniques provide the capability to shift the two reactors 50A, 50B from series operation to parallel (or independent) operation. In certain embodiments, the transfer slurry 21 is rerouted as a product slurry 27. In alternate embodiments, a product slurry 27 discharges from another location on the first loop reactor 50A, such as at different loop elbow on the discharge side of the pump 54A, and the transfer slurry 21 discharge is discontinued.

III. Polymerization Reactor System—Series and Parallel Configurations/Operations FIGS. 3A-5C are exemplary reactor systems 20 with two loop reactors 50A, 50B configured to operate in both series and parallel. The depicted reactor systems 20 are configured to operate in series but with the capability to "decouple" the two series reactors 50A, 50B so that they can operate in a parallel, i.e., the loop slurry reactors 50A, 50B may shift from a coupled series operation (e.g., FIG. 2) to a decoupled parallel operation, and vice-versa. In these illustrated examples of FIGS. 3A-5C, in either series or parallel operation, the second reactor 50B discharges a fluff product slurry 22 through a CTO modulating valve 25 to the monomer/diluent recovery system 24. In series configurations, a transfer slurry 21 discharges from the first reactor 50A to the second reactor 50B, such as discussed with respect to FIG. 2.

In parallel configurations, the transfer slurry 21 from the first reactor 50A to the second reactor 50B may be discontinued, and instead a fluff product slurry 27 discharges from the first loop reactor 50A. As discussed below, the fluff product slurry 27 may share the discharge point of the transfer slurry 21 or may have a different discharge point on the first loop reactor 50A. Furthermore, the reactor system 20 may be configured to route the product slurry 27 (i.e., during parallel operation) to different locations or systems. It should also be noted that existing adjacent polyolefin lines each having a single polymerization (loop) reactor may be retrofitted to provide for the depicted flexibility to operate in parallel and series modes, and thus to facilitate ease of monomodal and bimodal production, for example.

Figure 3A:
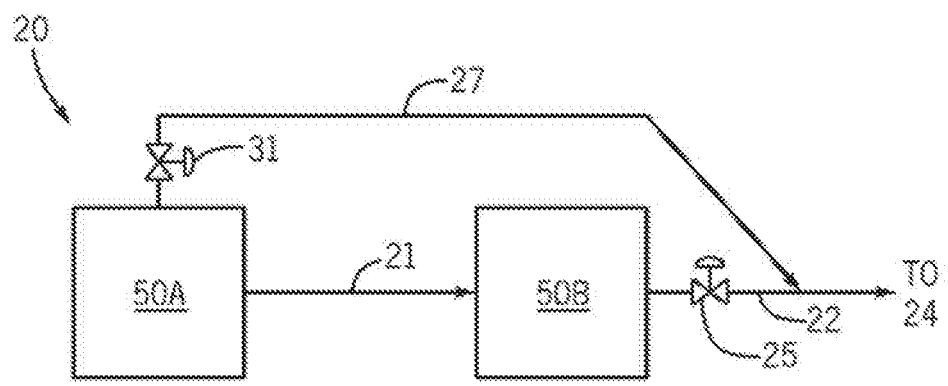
FIGS. 3A-5C are process flow diagrams of exemplary reactor systems applicable the polyolefin production system of FIG. 1 in accordance with embodiments of the present techniques.
Figure 3B:
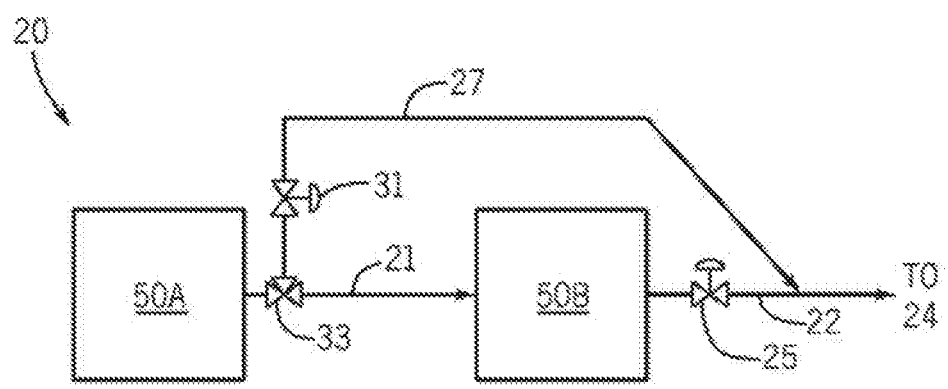
Figure 3C:
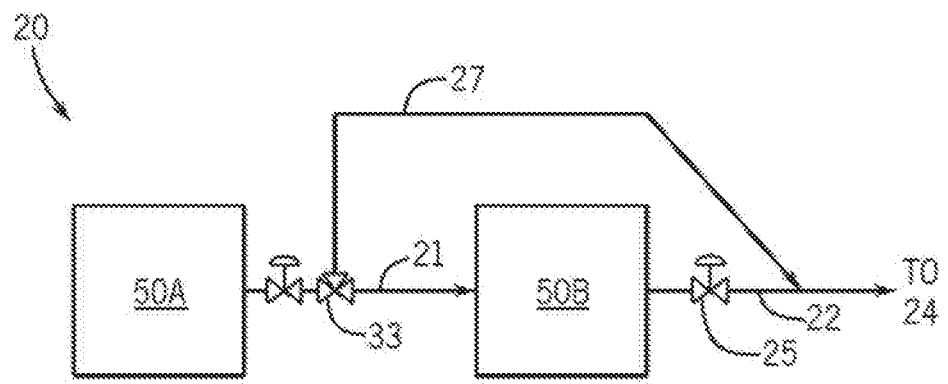

In FIGS. 3A-3C, the product slurry 27 from the first loop reactor 50A during parallel operation is sent to the monomer/diluent recovery system 24. The first reactor 50A and the second reactor 50B feed a fluff product slurry 27 and 22, respectively, to the same monomer/diluent recovery system 24. As depicted, the product slurry 27 (i.e., in parallel operation) from the first reactor 50A may tie into the product slurry 22 from the second reactor 50B, and share the same flash line in route to the monomer/diluent recovery system 24. The tie-in of the product slurry 27 to the product slurry 22 may have a piping configuration that provides for a relatively smooth transition or meeting of the product slurries 22 and 27 where possible. In alternate embodiments, the product slurry 27 from the reactor 50A may instead first meet the product slurry 22 from the reactor 50B in a vessel in the recovery system, 24, and not share a conduit or flash line in route to the recovery system 24. See vessel 64 in FIG. 13 as an example of such a vessel.

Figure 4A:
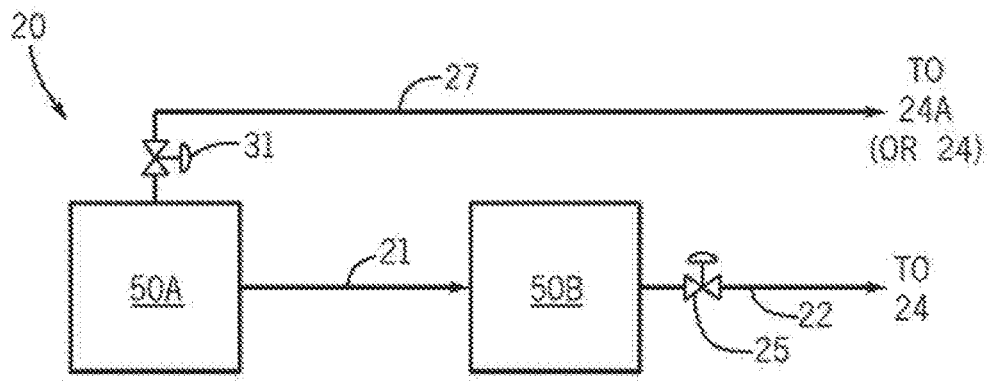
Figure 4B:
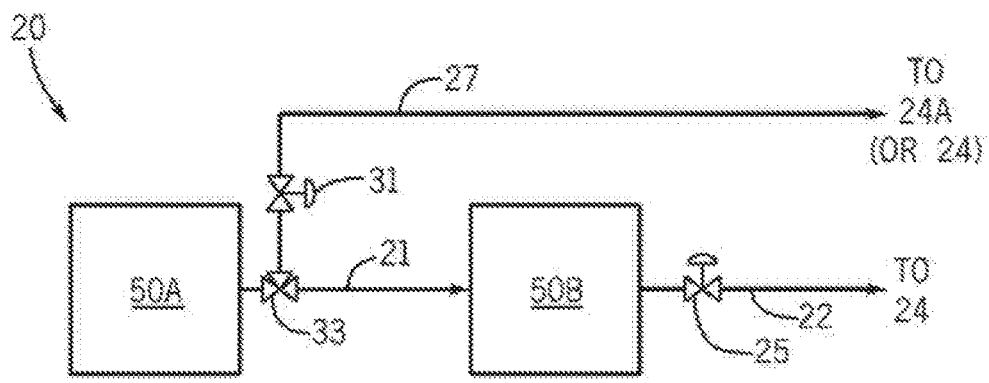
Figure 4C:
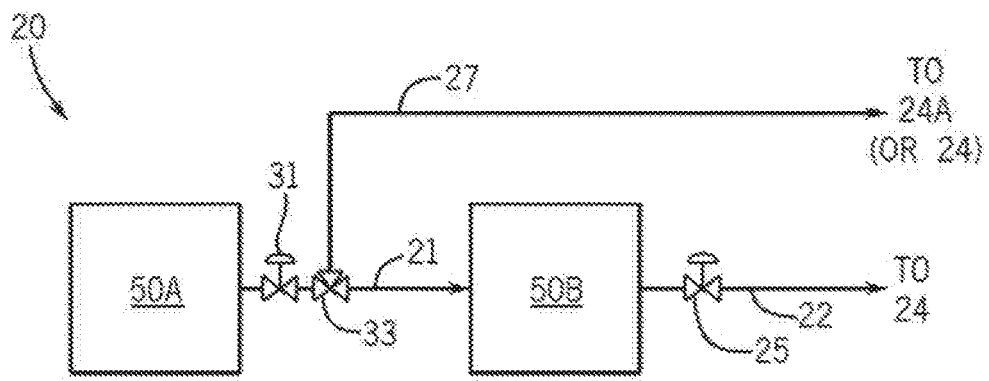

In FIGS. 4A-4C, the product slurry 27 from the first loop reactor 50A during parallel operation is sent to another monomer/diluent recovery system 24A in certain embodiments. As with the product slurry 22 from the reactor 50B, the product slurry 27 from reactor 50B may be routed through a flash line having a jacket heater, for example. The second monomer/diluent recovery system 24A may be a portion of a parallel polyolefin line, associated with a parallel reactor system, and/or associated with a parallel extrusion system, for example. On the other hand, the second monomer/diluent recovery system 24A may not be associated with a parallel polyolefin line. Of course, other dispositions of the second monomer/diluent recovery system 24 are contemplated.

Figure 13:
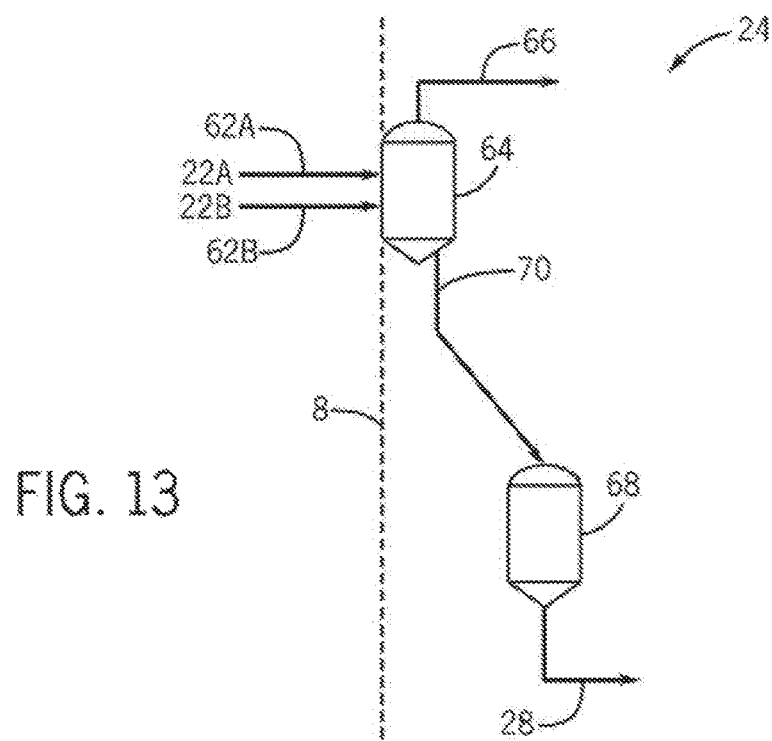
FIG. 13 is a process flow diagram depicting an exemplary separation vessel in a diluent/monomer recovery system as capable to receive two fluff product slurries from one or more reactor systems in accordance with embodiments of the present techniques.

In alternate embodiments, the product slurry 27 from the first loop reactor 50A during parallel operation may discharge to the same diluent/monomer recovery system 24 (and not to a second monomer/diluent recovery system 24A). In this case in certain examples, the product slurry 27 and the product slurry 22 first meet in a separation vessel (e.g., flash vessel) of the recovery system 24, and do not share a conduit or flash line in route to the recovery system 24. For example, the product slurries 22 and 27 enter such a separation vessel through respective inlet nozzles on the separation vessel as depicted in FIG. 13, for instance.

Figure 5A:
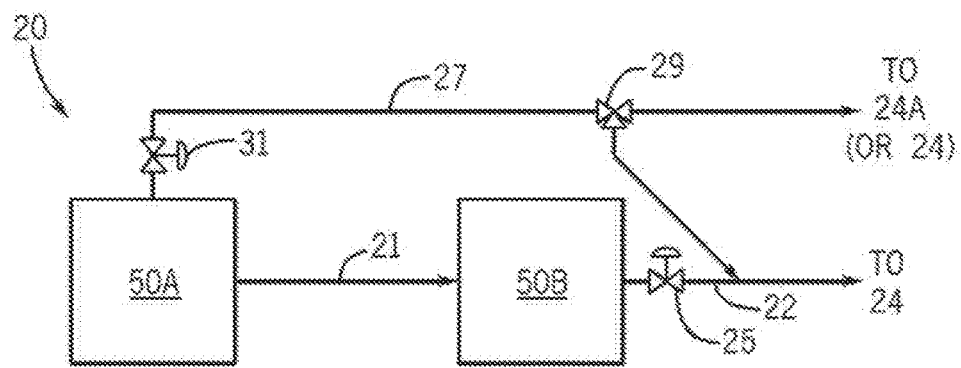
Figure 5B:
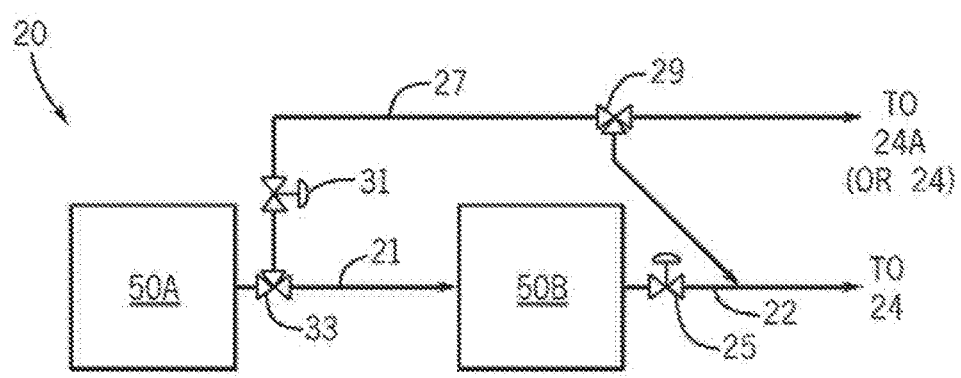
Figure 5C:
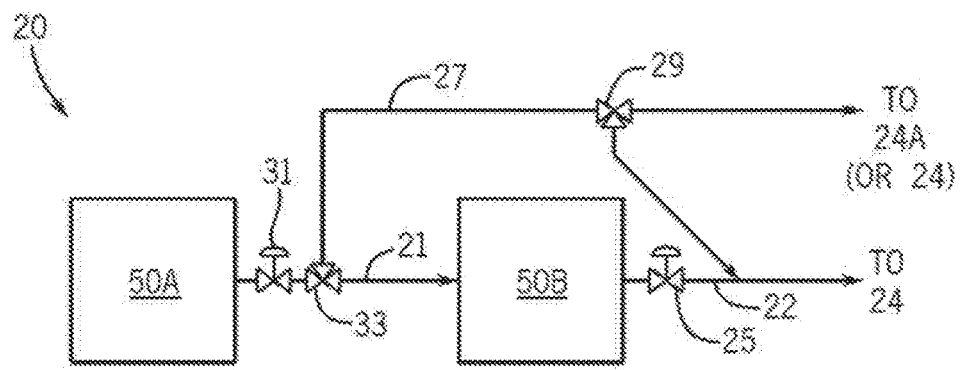

In FIGS. 5A-5C, the product slurry 27 from the first loop reactor 50A during parallel operation to be sent to either monomer/diluent recovery system 24 or 24A. Of course, as indicated, in these exemplary reactor system 20 configurations of FIGS. 3A-5C, the product slurry 27 may generally be routed through a flash line heater prior to entry into a flash vessel in the monomer/diluent recovery systems 24 or 24A.

The reactor systems 20 in FIGS. 5A-5C have the combined capability of FIGS. 3A-3C and 4A-4C, respectively, with a diverter valve or three-way valve 29, for example. The 3-way valve 29 (and other 3-ways valves in the system 10) may have one inlet and two outlets in certain embodiments. The fluid passageway in a 3-way ball valve may be Y-shaped (i.e., Y-type), T-shaped, and so on. In one example, the 3-way valve is a Y-type 3-way ball valve, for example. The 3-way valve and associated piping may generally provide for a relatively smooth transition in the slurry flow between the two outlet flow paths through the 3-way valve. Moreover, diverter valves other than the described 3-way valve may be employed. The present techniques accommodate the general concept of diverting slurries (and solids streams) in a variety of ways.

Again, with regard to FIGS. 3A-5C generally, during series operation in the reactor system 20, a transfer slurry 21 discharges from the first loop reactor 50A to the second loop reactor 50B. In the operating shift from series to a decoupled or parallel performance of the reactors 50A, 50B, the transfer slurry 21 may be stopped, and a product slurry 27 initiated from the first loop reactor 50. To discontinue operation of the transfer slurry 21, a respective isolation valve or RAM valve (not shown) at each end of the transfer line at the reactors 50A, 50B may be closed, for example. As for the fluff product slurry 27 (i.e., in the shift to parallel operation), the product slurry 27 may originate from the first loop reactor 50A in different ways. FIGS. 3A-5C give example configurations of the discharge of the product slurry 27 from the first loop reactor 50A.

FIGS. 3A, 4A, and 5A represent the product slurry 27 as originating from a different discharge location on the first loop reactor 50A than the discharge location of the transfer slurry 21. For instance, as discussed with respect to FIG. 2 above, the discharge of fluff product slurry 27 may be positioned on a different pipe elbow on the loop reactor 50A than the discharge for the transfer slurry 21L. Such a discharge for the product slurry 27 may be configured with a CTO such as an isolation valve or RAM valve (not shown) and a modulating valve 31 (e.g., v-ball control valve). As with fluff slurry discharges generally from loop reactors in embodiments of the present techniques, the discharge of the product slurry 27 may be configured and positioned on the loop reactor 50A such that the solids concentration in the product slurry 27 is greater than the solids concentration in of the slurry circulating in the loop reactor 50A.

FIGS. 3B, 4B, and 5B depict the product slurry 27 sharing the same or similar discharge location on the first loop reactor 50A as the transfer slurry 21. In these examples, the opening position of a 3-way valve 33 at the discharge may be rotated to shift between series and parallel operation. In series operation, the flow path of the 3-way valve 33 is set such that a transfer slurry 21 exits through an outlet of the valve 33 to the second reactor 50B. Conversely, in parallel operation, the flow path of the 3-way valve 33 is set to block the valve 33 outlet to the second reactor and instead route a product slurry 27 through the other outlet of the valve 33. The product slurry 27 exiting the valve 33 flows through a modulating valve 31 in this example.

FIGS. 3C, 4C, and 5C depict the product slurry 27 sharing the same or similar discharge location on the first loop reactor 50A as the transfer slurry 21. In this example, the modulating valve 31 is disposed upstream of the 3-way valve 33. The modulating valve 31 may be part of a CTO configuration on the loop reactor 50A. In parallel operation of the two loop reactors 50A, 50B, the control valve 31 may regulate the flow rate of the product slurry 27 and the pressure in the reactor 50A, as with a typical CTO configuration. Further, in parallel operation, the opening position or flow path of the downstream 3-way valve 33 may be set to route the product slurry 27 away from the reactor 50B. Conversely, in series operation, the modulating valve 31 may be maintained in a full-open position and a transfer slurry 21 routed to the second loop reactor 50B through the 3-way valve. In certain instances, it may be desired to utilize the discharge modulation of the valve 31 in series operation such as when desired to regulate the transfer slurry 21 flow rate or to regulate pressure in the first reactor 50A, and so on.

Figure 6A:
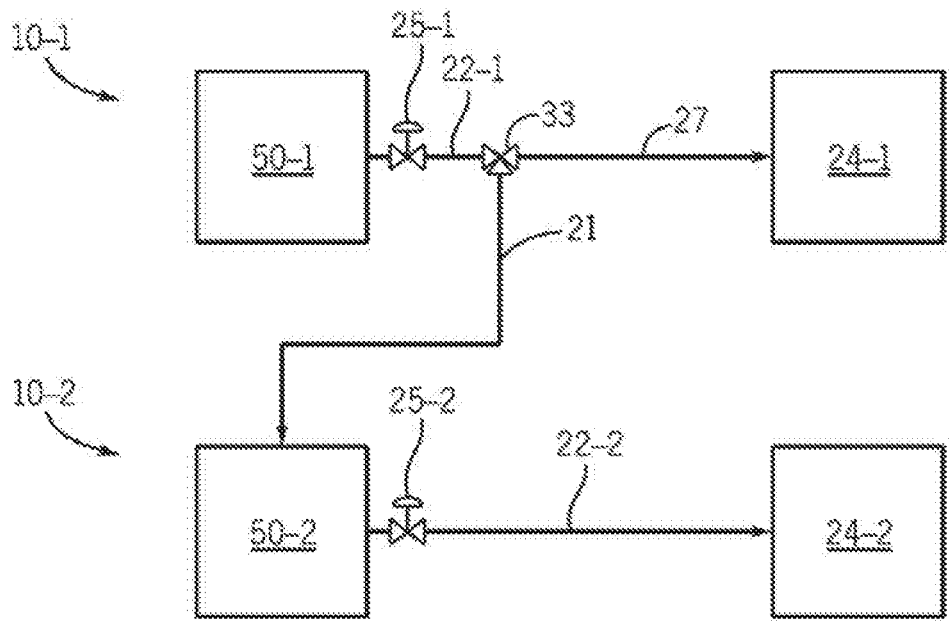
FIGS. 6A-6C are process flow diagrams of portions of exemplary adjacent polyolefin production systems in accordance with embodiments of the present techniques.
Figure 6B:
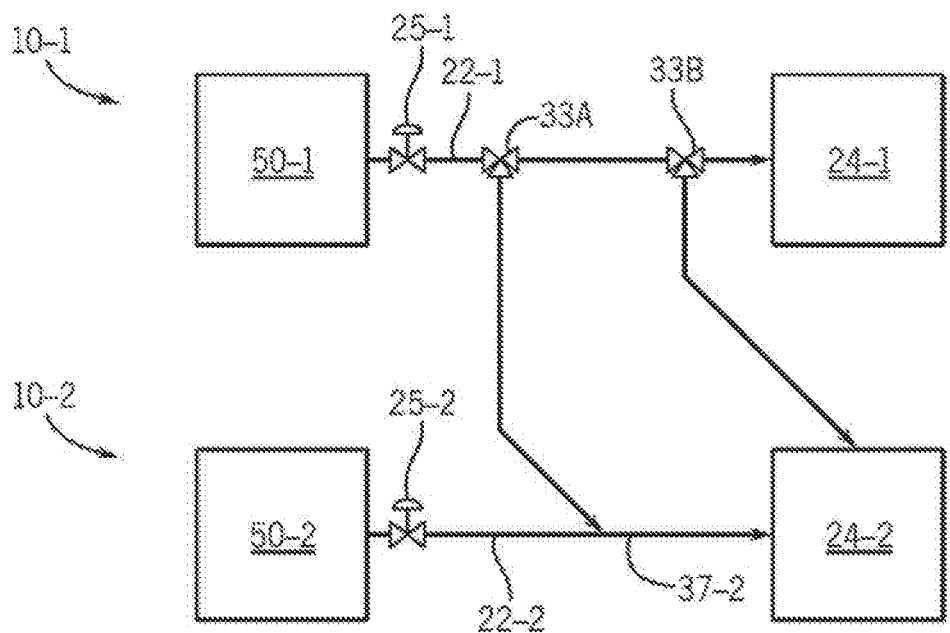
Figure 6C:
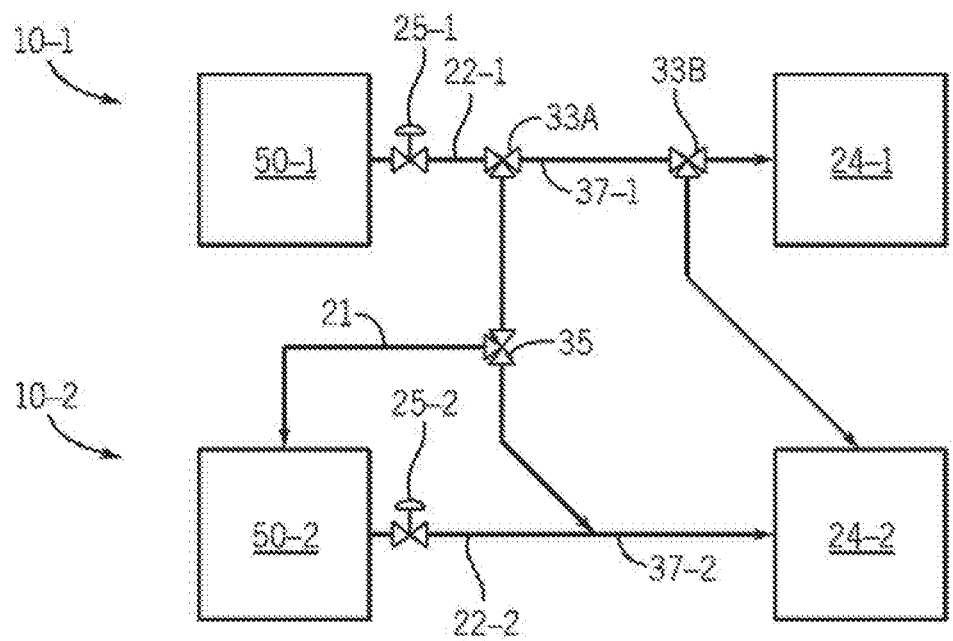

FIGS. 6A-6C depict portions of two polyolefin production lines 10-1 and 10-2 having a single loop reactor 50-1 and 50-2, respectively, and also a respective monomer/diluent recovery system 24-1 and 24-2 in this example. The loop reactor 50-1 of the first line 10-1 may discharge a fluff product slurry 22-1 through a CTO having a modulating valve 25-1 and through a flash line having a jacket heater (not shown) to a monomer/diluent recovery system 24-1. Likewise, the reactor 50-2 of the second line 10-2 may discharge a fluff product slurry 22-2 through a CTO having a modulating valve 25-2 and through a flash line having a jacket heater (not shown) to a monomer/diluent recovery system 24-2. This operation may be characterized as a parallel operation of the two reactors 50-1 and 50-2. The respective portions of the two polyolefin production lines 10-1 and 10-2 may reside at the same manufacturing site or facility, and in certain cases may be near or adjacent one another.

In FIG. 6A, the two reactors 50-1 and 50-2 may be shifted from parallel operation to series operation. In this example for series operation, a 3-way valve 33 may divert the product slurry flow 22-1 from the loop reactor 50-1 to the loop reactor 50-2. Thus, in this series operation, the product slurry flow 22-1 from the loop reactor 50-1 may be characterized as a transfer slurry 21 from a first loop reactor 50-1 to a second loop reactor 50-2. Therefore, the two reactors 50-1 and 50-2 may be decoupled for parallel operation or coupled in series operation. It should be noted that FIG. 6A is similar or analogous to FIG. 4C, but with FIG. 6A having an illustrated perspective of two adjacent polyolefin production lines.

In FIG. 6B, the fluff product slurry 22-1 from the loop reactor 50-1 may be sent to the monomer/diluent recovery system 24-1 or diverted to the diluent/monomer recovery system 24-2. Such diversion may be beneficial, for example, when desired to blend product slurry discharges from two loop reactors, or when desired to shut down the diluent/monomer recover system 24-1 for inspection or maintenance, and so forth. The diluent/monomer recovery system 24-2 may be sized accordingly, i.e., to handle product slurry discharges from two loop reactors.

In the illustrated embodiment, the product slurry 22-1 from the loop reactor 50-1 may be diverted to the recovery system 24-2 through the 3-way valve 33A or the 3-way valve 33B. If diverted through the first 3-way valve 33A, the product slurry 22-1 shares the flash line 37-2 with the product slurry 22-2. On the other hand, if diverted through the second 3-way valve 33B, the product slurry 22-1 flows through the flash line 37-1 and first meets the product slurry 22-1 in a separation or flash vessel in the recovery system 24-2. Such a vessel may have two inlet nozzles to receive two respective product fluff slurries (see FIG. 13 as an example).

FIG. 6C depicts a combination of the capability shown in FIGS. 6A and 6B. First, the product slurry 22-1 that discharges from the loop reactor 50-1 may be routed through a flash line 37-1 to the monomer/diluent recovery system 24-1. Second, the product slurry 22-1 that discharges from the loop reactor 50-1 may be diverted through the 3-way valve 33A and an additional 3-way valve 35 (introduced in FIG. 6C) as either: (1) a transfer slurry 21 to the loop reactor 50-2 for reactor series operation; or (2) a product slurry 22-1 to the monomer/diluent recovery system 24-2 (e.g. via sharing the same flash line 37-2 with the product slurry 22-2 discharging from the loop reactor 50-2). Third, as with FIG. 6B, the 3-way valve 33B downstream of the flash line 37-1 may divert the fluff product slurry 22-1 to the recovery system 24-2. Lastly, it should be noted that FIG. 6C is similar or analogous to FIG. 5C, but with FIG. 6C having an illustrated perspective of two adjacent polyolefin production lines.

Figure 7:
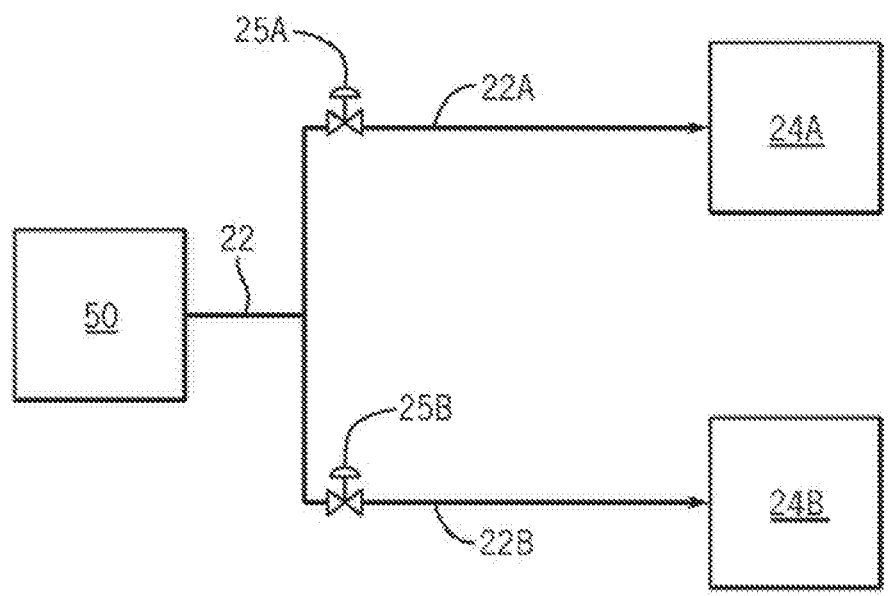
FIG. 7 is a process flow diagram of a loop reactor discharging to two diluent/monomer recovery systems in accordance with embodiments of the present techniques.

In FIG. 7, a loop reactor 50 simultaneously discharges to two monomer/diluent recovery systems 24A and 24B. Such may be beneficial, for example, when desired to discharge a reactor polyolefin product slurry to two different post-reactor treatment zones at the same time. The depicted loop reactor 50 may be a sole reactor or parallel reactor, or a terminal reactor of a series of reactors, in a reactor system 20. The product slurry 22 discharging from the loop reactor 50 divides and flows through both parallel modulating control valves 25A and 25B to the respective monomer/diluent recovery system 24A and 24B. Each of the slurries 22A and 22B may flow through a respective flash line heater.

The illustrated example shows the fluff product slurry 22 discharging from a single location on the loop reactor 50, and then split into two fluff product slurries 22A and 22B. However, in an alternate example (not shown), the two product slurries 22A and 22B originate from two respective locations on the reactor 50. In either case, the slurries 22A and 22B flow through the respective control valves 25A and 25B and different flash lines to different recovery systems 24A and 24B, as discussed.

The modulating valves 25A and 25B may regulate flow rate of their respective product slurry 22A and 22B, as well as regulate the pressure in the reactor 50, for example.

In a first control example, the flow rate of each slurry 22A and 33B is measured with a respective mass meter, for instance, and the each control valve 25A and 25B modulated to control the measured slurry 22A and 22B flow rates to a respective set point. In a second control example, one of the modulating valves 25A or 25B is maintained at a fixed open (percentage) position and the other modulating valve 25A or 25B is modulated to regulate the total product slurry flow rate from the loop reactor 50 and the pressure in the loop reactor 50. Of course, other control logic may be implemented.

Figure 8:
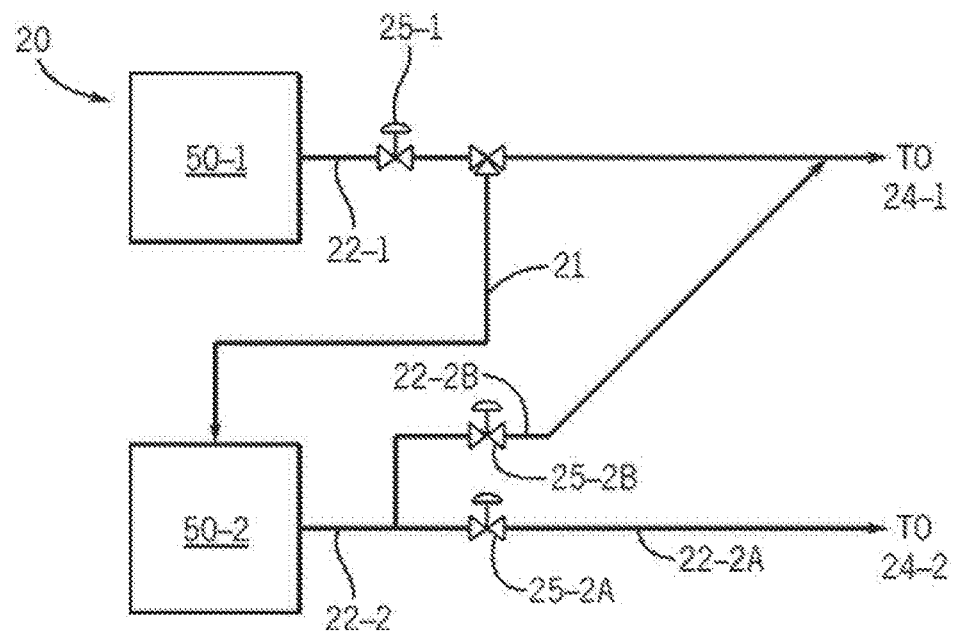
FIG. 8 is a process flow diagram of an exemplary reactor system of the polyolefin production system of FIG. 1 in accordance with embodiments of the present techniques.

FIG. 8 is a reactor system, having two reactors 50-1 and 50-2 that may operate in parallel and discharge respective product slurries 22-1 and 22-2 to respective monomer/diluent recovery systems 24-1 and 24-2. As for the reactor 50-2 in such parallel operation, the control valve 25-2B may remained closed, and the control valve 25-2A in operation, for example.

Further, the two reactors 50-1 and 50-2 may be coupled operationally in series such that the reactor 50-1 is the first reactor in the series and feeds its product slurry 22-1 as a transfer slurry 21 to the reactor 50-1 which is the second or terminal (final) reactor in the series. Similar to the loop reactor in FIG. 7, the second reactor 50-2 in FIG. 8 in series operation discharges product slurry simultaneously to two monomer/diluent recovery systems 24A and 24B. Such an installation may be grassroots. On the other hand, adjacent polyolefin production lines may be retrofitted with the depicted capability. A benefit may be to facilitate production of various polyolefin monomodal and bimodal polymer products, as indicated above.

IV. Diluent/Monomer Recovery System

Figure 9:
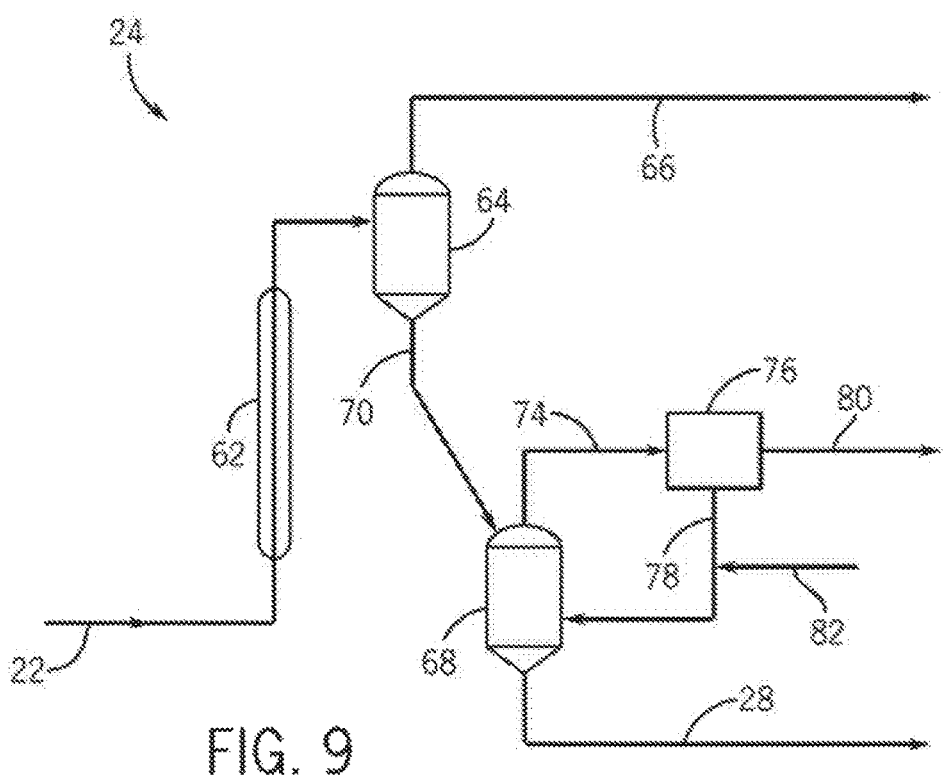
FIGS. 9-11 are process flow diagrams of exemplary diluent/monomer recovery systems applicable in the polyolefin production system of FIG. 1 in accordance with embodiments of the present techniques.

FIG. 9 an exemplary diluent/monomer recovery system 24. At the outset, it should be emphasized that the diluent/monomer recovery system 24 (see also FIG. 1) discussed herein and that receives and processes the discharge slurry 22 from the reactor system 20 is given as exemplary. Indeed, a variety of other equipment, configurations and unit operations may be employed to remove or separate diluent, monomer, and other components from the polyolefin (e.g., polyethylene) product fluff slurry 22.

The polyolefin product fluff slurry 22 discharging from the loop reactor (e.g., reactor 50B of FIG. 2) flows through a flash line having an in-line flash heater 62, and into a separation vessel 64. The separation vessel 64 may be a flash vessel, a flash chamber, a simple settling drum, a high efficiency cyclone, or combination of cyclone and flash chamber, or other suitable device to separate the solids from the majority of the diluent. The diluent/monomer recovery system 24 may be defined as incorporating the flash line and in-line flash heater 62. On the other hand, the diluent/monomer recovery system 24 may be defined as excluding such and instead beginning with the separation vessel 64, and thus the flash line and in-line flash heater 62 disposed between the reactor system 20 and the recovery system 24.

The in-line flash heater 62 may be a surrounding conduit or jacket that uses steam or steam condensate, for example, as a heating medium to provide indirect heating to the slurry 22. Thus, the loop slurry reactor effluent (such as product fluff slurry 22 from the second loop reactor 50B of FIG. 2, or other terminal reactor or combination of loop reactors) is heated prior to its introduction into the separation vessel 64 (e.g., flash chamber). Further, the slurry 22 may generally experience a pressure reduction through the flash line and therefore vaporization of non-solid components prior to entering the separation vessel 64 due to both pressure decrease and temperature increase through the flash line. As indicated, above, the flash line and the surrounding conduit or jacket heater is configured to volatize the diluent and to increase enthalpy of the slurry 22. The liquid hydrocarbon in the product slurry 22 may be partially vaporized or substantially fully vaporized prior to entry of the slurry 22 into the separation vessel 64. Also, before the product fluff slurry 22 enters the separation vessel 64, water or other catalysts poisons may be injected into the slurry 22 to deactivate any residual catalysts and cocatalysts in the slurry 22. Because these injected components are generally catalysts poisons, they are typically completely removed, or at least substantially removed, from any recovered material (e.g., monomer or diluent) recycled to the reactors 50A, 50B, 50-1, 50-2, etc.

The separation vessel 64 has an entry to receive the product fluff slurry 22, which may be a nozzle or other inlet type. In certain embodiments, the entry on the separation vessel 64 may be a tangential entry (e.g., tangential entry nozzle), as appreciated by the skilled artisan. Further, according to the present techniques, the separation vessel 64 may have two or more entries or inlet nozzles (only one is shown) to receive parallel fluff slurries. See FIG. 13 as an example. In other examples of the present techniques, the separation vessel 64 may receive, through a single inlet, two or more product fluff slurries combined in the upstream flash line. In either case, the separation vessel may be sized to accommodate the mass and volume of two or more product fluff slurries. For instance, the volume of the separation vessel 64 may be larger. Further, the disengagement section of the separation vessel may be affected. Whether receiving one slurry or multiple slurries, the separation vessel 64 that receives the fluff product slurry 22 from the loop reactor may be a high-pressure flash or low-pressure flash (e.g., 7 psig), a collecting vessel, or other configurations, and so forth. With a high pressure flash, the vaporized hydrocarbon (e.g., flash gas 66 which may include diluent, monomer, comonomer) beneficially may not need compression prior to condensation and recycle, i.e., recycled to the feed system 16 (FIG. 1) and reactor system 20. In contrast, the vaporized hydrocarbon from a low-pressure flash is generally compressed prior to condensation and recycles to the feed system 16 and reactor system 20. Exemplary operating pressures are in the range of 0 psig to 15 psig for a low-pressure flash, and in the range of 120 psig to 450 psig for a high-pressure flash depending on the diluent employed, for example.

An additional flash vessel (not shown) may be disposed between the separations (flash) vessel 64 and the purge column 68. The additional flash vessel receives the solids stream from the separation vessel 64 and discharges a solids stream to the purge column 68. In one example, the separation vessel 64 is a high-pressure flash, and the additional flash vessel (not shown) is a low-pressure flash. In another example, the separation vessel 64 is a high-pressure flash, low-pressure flash, or collecting vessel, and the additional flash vessel (not shown) is a concentrator (or one or more concentrators in parallel) which may have intake and outlet valves. In examples of the separation vessel 64 as a collecting vessel, the polyolefin fluff settles in the collecting vessel. The concentrators as the additional vessel may beneficially reduce the amount of vapor or gas transferred from the separation vessel 64 to the purge column 68.

However, again, a single separation flash vessel 64, as depicted, may be employed and that discharges the fluff solids to the purge column 68. Thus, in this latter case, the capital and operating costs of a second flash or second major vessel generally are not incurred. Moreover, in the embodiments of the separation vessel 68 as a high-pressure flash, the flashed hydrocarbon (flash gas 66) from the separation vessel 64 generally need not be compressed.

In the flash chamber 64 (e.g., or more generally a separation vessel), whether low pressure or high pressure, most of the non-solid components of the reactor discharge slurry 22 are withdrawn overhead as vapor in the flash gas 66 and recycled to the reactor system 20 (i.e., via the feed system 16). The condensed flash gas 66 may be may bypass 34 the fractionation system 30 in mute to a reactor 50 (i.e., via the feed system 16), for example (see also FIG. 1). On the other hand, all or a portion of the flash gas 66 (as vapor and/or condensed liquid) may be sent to the fractionation system 30 (see also FIG. 1).

In polyethylene production, this flash gas 66 is typically primarily diluent, such as isobutane or other diluents previously mentioned. It may also contain most of the unreacted monomer (e.g., ethylene) and other light components, as well as unreacted comonomer (e.g., 1-hexene, butene, 1-pentene, 1-octene, and 1-decene) and other heavy components (e.g., hexane and oligomers). An exemplary approximate composition of the flash gas 66 for a high-pressure flash is 94 wt. % isobutane, 5 wt. % ethylene, and 1 wt. % other components. A level or volume of fluff may be maintained in the flash chamber 64 to give additional residence time of the fluff in the chamber 64 to facilitate separation of liquid and vapor entrained in the porous fluff particles.

The flash gas 66 may be processed in equipment such as cyclones, bag filters, etc., where entrained fluff solids are removed and returned to the flash chamber 64 or to downstream equipment, such as the purge column discussed below. The flash gas 66 may also travel through a de-oxygenation bed, for example. Furthermore, as indicated, the flash gas 66 may be cooled or condensed in a heat exchanger (e.g., shell-and-tube construction) prior to its recycle to the feed system 16 or fractionation system 30 (see also FIG. 1). Beneficially, in part because of the operating pressure of the flash chamber 64 in certain embodiments, such cooling, condensation, and direct recycle of the flash gas 66 may be performed without compression in some examples, such as with a high-pressure flash. The flash gas 66 may correspond to part or all of recycle streams 26 and 34 of FIG. 1 in certain examples.

As for the solids (polymer) in the flash chamber 64, they are withdrawn with a small amount of entrained diluent (and monomer) and sent to a purge column 68 via solids discharge 70. As will be appreciated by those of ordinary skill in the art, the solids discharge 70 conduit may include valve configurations that allow polymer to flow downward through the conduit while reducing the potential for vapor to flow between the purge column 68 and the flash chamber 64. For example, one or more rotary or cycling valves, a single v-ball control valve, fluff surge tanks, relatively small fluff chamber, and so on, may be disposed on the solids discharge 70 conduit. Moreover, a level of solids may be maintained in the flash chamber 64 via a level control valve at the base of the flash chamber 64 or on the solids discharge conduit 70, providing for increased residence time of the solids in the flash chamber 64.

In more traditional configurations with the flash chamber 64 as a high-pressure flash, the fluff solids from the flash chamber 64 may discharged into a lower pressure flash chamber, as discussed above, with the lower pressure flash gas requiring compression for recycle to the reactor. However, newer technologies have provided for elimination of a low-pressure flash and the associated gas compression, and instead discharge of the fluff solids from a high-pressure flash chamber 64 to the purge column 68.

In the illustrated embodiment, the primary solids feed to the downstream purge column 68 is typically the solids discharge 70 (polyolefin fluff) that exits the flash chamber 64. A purpose of the purge column 68 is to remove residual hydrocarbon from the entering solids streams and to provide substantially-clean polymer fluff 28 with at most relatively small amounts of entrained volatile organic content (VOC). The fluff 28 may be transported or conveyed to the extrusion system 36 (see FIG. 1 and FIG. 15) for conversion to pellets 38, and for distribution and sale as polyolefin pellet resin to customers 40 via loadout system 39 (see FIG. 1 and FIG. 15). In general, the treated polymer particles discharged from purge column 68 as polymer fluff 28 may be processed in a conventional finishing operation, such as a twin screw extruder, in the extrusion system 36 (FIG. 1).

In the exemplary purge column 68 system illustrated, nitrogen is injected into a purge column 68 to remove or displace residual hydrocarbons via overhead discharge 74. This discharge 74 may be sent through a separation unit 76, such as a membrane recovery unit, pressure swing adsorption unit, refrigeration unit, and so forth, to recover nitrogen via nitrogen stream 78, and to discharge a separated hydrocarbon stream 80 which may be compressed and fed to the fractionation system 30, for example. This separated hydrocarbon stream 80 may correspond to a portion of stream 26 of FIG. 1 in certain examples. In the art, the separation unit 76 may be known as a Diluent Nitrogen recovery Units (DNRU). Isobutane Nitrogen Recovery Unit (INRU), and the like. Moreover, fresh nitrogen 82 may be added to the nitrogen circuit to account for nitrogen losses in the purge column 68 system. Finally, it should be noted that the hydrocarbon stream 80 discharging from the separation unit 76 may be compressed and processed in the fractionation system 30 (FIG. 1) to give olefin-free diluent used in catalyst preparation and reactor or line flushes.

Lastly, as will be appreciated by those of ordinary skill in the art, a variety of configurations may be employed in the diluent/monomer recovery system 24. For example, the solids discharge 70 from the flash chamber 64 may be sent to another reactor (e.g., a liquid phase reactor or gas phase reactor) or to a low-pressure flash chamber instead of to the purge column 68. The polymer may then later enter the purge column 68 (i.e., from the additional reactor or low-pressure flash chamber). If discharged to another reactor from the flash chamber 64, catalyst poison is generally not injected upstream in the discharge 22, and, thus, residual active catalysts remain for further polymerization. In another configuration, the purge column 68 may be eliminated from the recovery system 20 and combined with the downstream extruder feed tank, and residual hydrocarbon or volatile organic (VOC) removal performed in such a combination. Indeed, the separation unit 76 associated with the purge column 68 may be relocated to accommodate the purge column/extruder feed tank combination, for example. Of course a variety of other configurations and types of vessels and equipment are contemplated in the present techniques.

Figure 11:
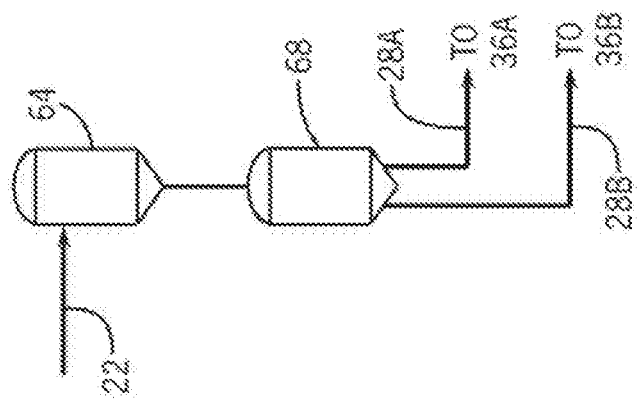
Figure 10:
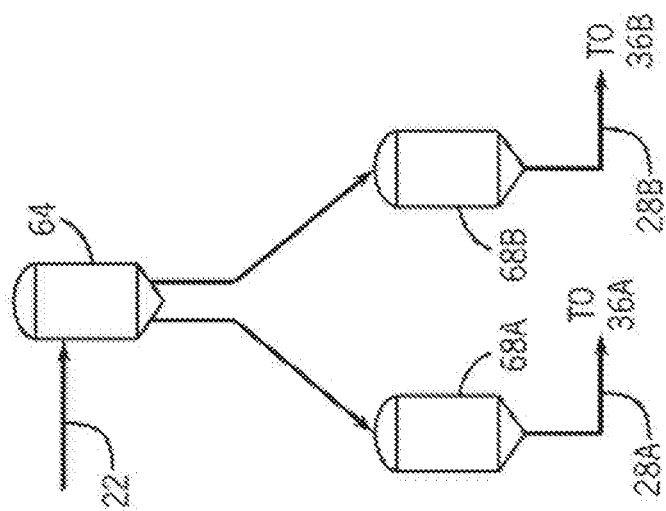

FIGS. 10 and 11 are alternate embodiments that split fluff solids streams in the monomer/diluent recovery system 24. Two treated fluff solids stream 28A and 28B are discharged from the monomer/diluent recovery system 24, and may be sent to different extruder feed tanks. Such may be beneficial, for example, if desired to feed two different extruder systems 36A and 36B. Such configuration and operating flexibility may be advantageous in addressing capacity concerns of extrusion systems, and/or the desire to use different respective additive packages in the two extrusion systems, and so forth. Moreover, it should be noted that the separation vessel 64 may be configured to receive more than one product fluff slurry 22, as discussed above with respect to FIG. 9. Again, for example, two product slurries 22 may be combined in the upstream flash line, or may be received separately at the separation vessel 64 via two inlet nozzles and combined in the separation vessel 64.

FIG. 10 is an alternate embodiment of the monomer/diluent recovery system 24 in having two purge columns 68A and 68B in parallel. The separation vessel 64 (e.g., flash chamber or flash drum) receives the fluff product slurry 22 from the reactor system 20. The separations vessel 64 may be a high-pressure flash or low-pressure flash. In the illustrated embodiment, the separations vessel 64 discharges two solids streams 70A and 70B, such as via two bottom discharge nozzles on the vessel 64 and each discharge nozzle or conduit having a level control valve (not shown), for example. An exemplary control scheme may involve operating one of the level control valves at a fixed open position, and with the other level control valve modulating to control the fluff solids level in the vessel 64. The two solids streams 70A and 70B discharge to the two respective purge columns 68A and 68B. The two purge columns 68A and 68B may discharge respective treated fluff solids streams 28A and 28B to different extruder feed tanks, for example.

FIG. 11 is an alternate embodiment of the monomer/diluent recovery system 24. The separation vessel 64 (e.g., flash chamber, flash drum, etc.) receives the fluff product slurry 22 from the reactor system 20. The separations vessel 64 may be a high-pressure flash or low-pressure flash. In the illustrated embodiment, the separations vessel discharges a fluff solids stream 70 to the purge column 68. In this alternate embodiment, the purge column 68 discharges two solids streams 28A and 28B, such as via two bottom discharge nozzles on the purge vessel 68 and with each discharge nozzle or conduit having a level control valve (not shown), for example. An exemplary control scheme may involve operating one of the level control valves at a fixed open percentage position, and with the other level control valve modulating to control the fluff solids level in the vessel 68. The two treated fluff solids streams 28A and 28B may be sent to different respective extruder feed tanks, for example.

Figure 12:
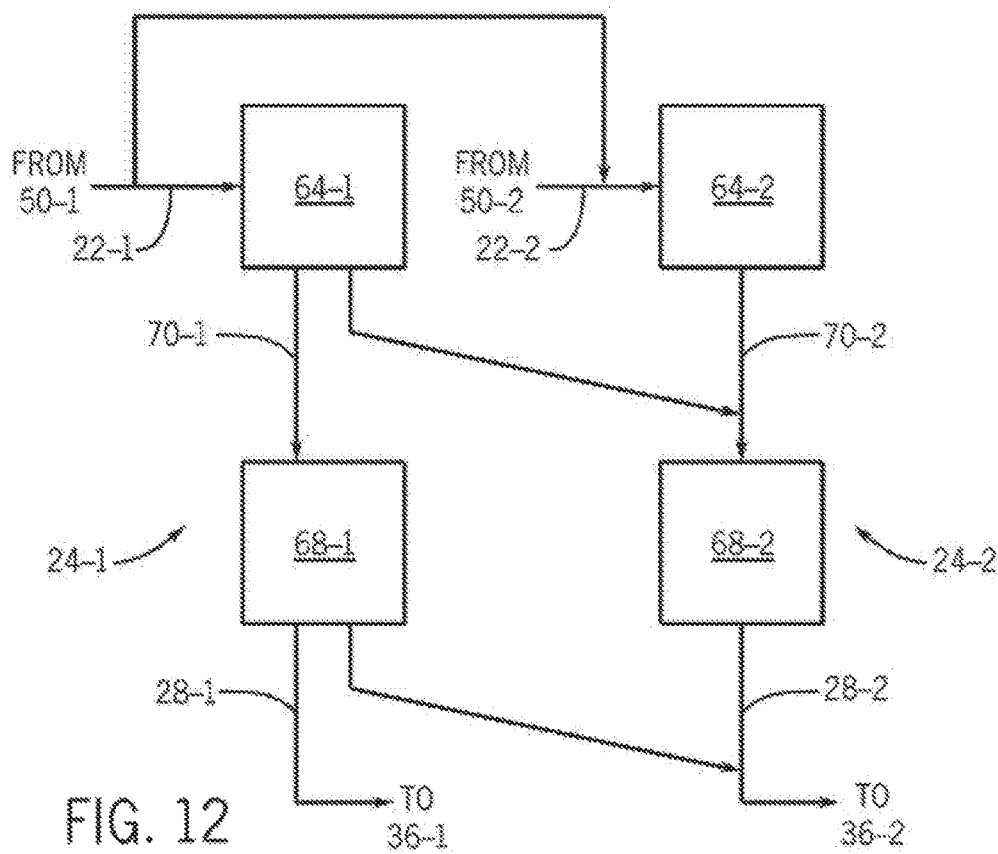
FIG. 12 is a process flow diagram of two adjacent exemplary monomer/diluent recovery systems in accordance with embodiments of the present techniques.

FIG. 12 depicts two monomer/diluent recovery systems 24-1 and 24-2 that may be coupled and decoupled in operation. The two monomer/diluent recovery systems 24-1 and 24-2 may be disposed at the same manufacturing facility and each a portion of a respective polyolefin production line, for example. In certain examples, the monomer/diluent recovery systems 24-1 and 24-2 may be near or adjacent one another. Moreover, the coupling/decoupling capability depicted in FIG. 12 and explained below may be installed grassroots. On the other hand, such capability may be installed as a retrofit of an existing installation, e.g., a retrofit of two independent recovery systems 24-1 and 24-2 near or adjacent one another. In either case, the separation vessels (64-1 and 64-2 may be equipped to receive multiple product slurries as discussed above with respect to FIG. 9.

Nevertheless, in the recovery system 24-1, the separation vessel 64-1 (e.g. flash drum) is capable to receive a polyolefin fluff product slurry 22-1 from a loop reactor 50-1, and to discharge a fluff solids stream 70-1 to a purge column 68-1. The purge column 68-1 treats the fluff solids to remove residual hydrocarbon and discharges treated fluff solids 28-1 to an extruder feed tank in the extrusion system 36-1. A level of fluff solids in the separation vessel 64-1 may be maintained via a level control valve (not shown) on the discharge of the separation vessel 64-1 and that regulates the flow rate of the fluff solids stream 70-1. Similarly, a level of fluff solids in the purge column 68-1 may be maintained via a level control valve (not shown) on the discharge of the purge column 68-1 and that regulates flow rate of the fluff solids 28-1.

Likewise, in the recovery system 24-2, a separation vessel 64-2 (e.g., flash drum) is capable to receive a polyolefin fluff product slurry 22-2 from a loop reactor 50-2, and to discharge a fluff solids stream 70-2 to a purge column 68-2. The purge column 68-2 treats the fluff solids to remove residual hydrocarbon and discharges treated fluff solids 28-2 to an extruder feed tank in the extrusion system 36-2. A level of fluff solids in the separation vessel 64-2 may be maintained via a level control valve (not shown) on the discharge of the separation vessel 64-2 and that regulates the flow rate of the fluff solids stream 70-2. Similarly, a level of fluff solids in the purge column 68-2 may be maintained via a level control valve (not shown) on the discharge of the purge column 68-2 and that regulates flow rate of the fluff solids 28-2. Such foregoing operations of the two systems 24-1 and 24-2 may be a decoupled parallel operation.

In coupled operations, the separation vessel 64-1 if involved, i.e., receives a fluff product slurry 22-1 from the loop reactor 50-1, discharges to the purge column 68-1 and/or purge column 68-2. Therefore, operationally, the separation vessel 64-1 may discharge to the purge column 68-2 in addition to or in lieu of discharging to the purge column 68-1. Further, the purge column 68-1 if involved in the coupled operation, i.e., receives the solids stream 70-1 from the separation vessel 64-1, discharges to the extrusion system 36-1 and/or extrusion system 36-2. Thus, the purge column 68-1 may discharge to the extrusion system 36-2 in addition to or in lieu of discharging to the extrusion system 36-1. Therefore, the coupled operations in FIG. 12 may provide for splitting, diverting, and combining fluff solids streams, giving operation, maintenance, and product flexibility.

Examples of the one or two discharges from each of the separations vessel 64-1 and the purge column 68-1 may involve two discharges from each vessel (e.g., two discharge nozzles on each vessel) with each discharge having a level control valve. Thus, when two fluff solids streams discharge from a given vessel (i.e., from 64-1 or 68-1), the level control valve on each discharge may operate, or one level control valve may be maintained at a constant open percentage position, and the other level control valve modulated to regulate the solids level in the vessel. For the case of an operation giving a single discharge of fluff solids, one of the level control valves may be closed, or a single physical discharge from the vessel may be employed and a diverter valve or 3-way valve used to route a single fluff solids stream.

Thus, in coupled operations, the separation vessel 64-1 may discharge to the purge column 68-2 in addition to simultaneously discharging to the purge column 68-1, such as via an additional (second) discharge and additional (second) level control valve (not shown). The separation vessel 64-1 may also discharge to the purge column 68-2 in lieu of discharging to the purge column 68-1, such as by closing the level control valve on the first discharge, or by discharging via the first discharge and through a diverter or 3-way valve (not shown), for example. Further, in coupled operations, the separation vessel 64-1 may discharge to the extrusion system 36-2 in addition to discharging simultaneously to the extrusion system 36-1, such as via an additional discharge and additional level control valve (not shown). Operationally, the separation vessel 64-1 may also discharge to the extrusion system 36-2 in lieu of discharging to the purge column 68-1, such as via the first discharge and a diverter or 3-way valve (not shown), for example. Lastly, it should be noted that the product fluff slurry 22-1 from the loop reactor 50-1 may be split or diverted to the separation vessel 64-1, such as via concepts discuss with respect to FIGS. 6A-8.

FIG. 12 may be characterized as depicting the respective monomer/diluent recovery systems 24-1 and 24-2 of two polyolefin production lines both having a respective loop reactor 50-1 and 50-2. As indicated, the loop reactor 50-1 of the first line 10-1 may discharge a fluff product slurry 22-1 through a heated flash line to the monomer/diluent recovery system 24-1. Likewise, the reactor 50-2 of the second line 10-2 may discharge a fluff product slurry 22-2 through a heated flash line to the monomer/diluent recovery system 24-2. This operation may be characterized as a parallel operation of the two reactors 50-1 and 50-2. These respective portions of the two polyolefin production lines may reside at the same manufacturing facility, and in certain cases may be near or adjacent one another.

FIG. 13 depicts the separation vessel 64 as capable to receive two fluff product slurries 22A and 22B from one or more reactor systems 20 (through respective flash line inline heaters 62A and 62B). In certain embodiments, the flash lines including their inline heaters 62B and 62B are considered part of the reactor system(s) or as disposed between the reactor systems and the diluent/monomer recovery system 24. In the illustrated embodiment, the recovery system 24 (and the post-reactor fluff treatment system) is defined as beginning with the separation vessel 64, as indicated by reference line 8. The separation vessel 64 has two inlets to receive the respective fluff product slurries 22A and 22B which first meet in the separation vessel 64 and do not meet in an upstream conduit or flash line.

As indicated above, the two entries on the exemplary separation vessel 64 in the illustrated embodiment may each be tangential entry (e.g., tangential entry nozzle). On the other hand, one or both of the entries may be a simple nozzle. Further, the separation vessel 64 may be sized to accommodate the mass and volume of two or more product fluff slurries 22A and 22B. For instance, the volume, height, width, and disengagement section of the separation vessel 64 may be larger.

V. Extrusion System and Loadout System

Figure 14:
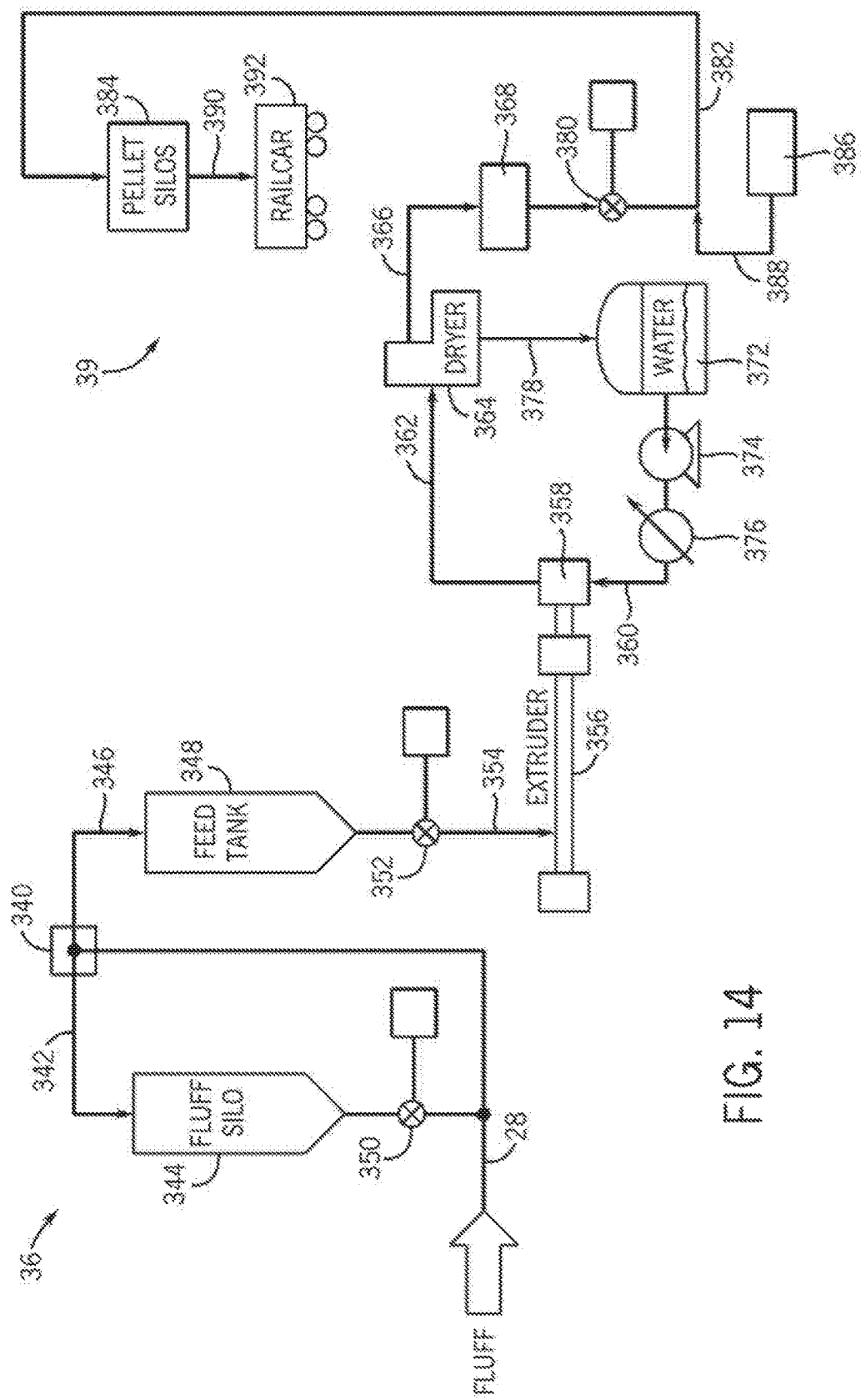
FIG. 14 is a process flow diagram of an exemplary extrusion system and loadout system of the polyolefin production system of FIG. 1 in accordance with embodiments of the present techniques.

FIG. 14 is a process flow diagram of an exemplary extrusion system 36 and exemplary loadout system 39 of FIG. 1. Polyolefin fluff 28 from the purge column 68 (e.g., FIG. 9) may be pneumatically transferred, for example, using a dilute phase blower, through a valve 340 (e.g., a diverter or 3-way valve) in the extruder system 36, and either into conduit 342 to the fluff silo 344, or into conduit 346 to the extruder feed tank 348. The fluff silo 344 may be used to provide surge capacity during shutdown of the extruder (or of other operations) in the extrusion system 36. On the other hand, the fluff silo 344 may also accumulate fluff to allow for full-rate operation of the extruder while the upstream polymerization reactors 50A, 50B "catch up" during startup of the reactors 50A, 50B. The polyolefin fluff in silo 344 may be pneumatically transferred to the extruder feed tank 348 through rotary valve 350 with the aid of a blower system (not shown).

Typically, however, the primary flow of polyolefin fluff 28 is to the extruder feed tank 348 via conduit 346. Downstream, rotary valve fluff 352 may feed polyolefin fluff 354 to the extruder 356, where the extruder heats, melts, and pressurizes the polyolefin fluff 354. As will be appreciated by those of ordinary skill in the art, the fluff 354 from the extruder feed tank 348 may be metered to the extruder 356 with a variety of meters, such as smart flowmeter-type, master-feeder type, and so forth.

Furthermore, additives may be injected into the fluff 354 stream at an addition rate which may be based on a specified ratio to the mass flow rate of the fluff 354. This ratio or "slave" feed of additives to fluff 354 may be specified at a value to generate a desired recipe, for example, for each polyolefin grade or product, and to give the desired properties of the downstream polyolefin pellets. Furthermore, the additive addition may be accomplished with a liquid additive system, loss-in-weight-feeders, and the like. In certain embodiments, one or more of lost-in-weight feeders may be used to meter a pre-mixed additive package fed from a bulk container, for example, to the extruder 356 via the fluff 354 stream, via an extruder feed hopper (not shown), or directly to the extruder 356 such as with injection into the polyolefin melt in the extruder 356, and so on. As mentioned above with respect to FIG. 1, additives or additive packages placed into the extruder feed or into the extruder (e.g., injected into the melt channel of the extruder) may include surface modifiers (e.g. slip agents, antiblocks, tackifers), UV inhibitors, antioxidants (e.g., phenolics, phosphites, thioesters, amines, etc.), colorants, pigments, processing aids (e.g., flow promoters such as waxes & oils and fluoroeslastomers), peroxides, and other additives.

The surface modifiers may alter the surface characteristics of a film or coating subsequently-formed from the pellets 38 to control coefficient of friction (COF) or tackiness. For example, surface modifiers that are slip agents (e.g., stearamide, oleamide, erucamide, etc.) may reduce the COF of the subsequently-formed films and coatings. Surface modifiers that are antiblocks may reduce sticking together of adjacent film surfaces such as in a roll of finished bags, for instance. Surface modifiers as tackifiers (e.g., polyisobutene or PIB) may be added in either dry form (e.g., masterbatch addition) to the extruder feed or injected as a liquid into the melt channel of the extruder, to promote stickiness and "cling" between adjacent film surfaces, such as with the manufacture of polyethylene stretch films, for instance.

Specialized additives may be added to improve a specific performance attribute. Other additives may include fire retardants (to reduce flammability of the polyolefin resin), antistats (to reduce static charges developed during extrusion, conversion in later processing, and end-use such as with the consumer product), scavengers and absorbers (to absorb odors and gaseous compound such as from the film and/or the packaged product), odor enhancers (to impart a desirable odor to the subsequently-formed film), degradation agents (to increase polymer break-down during disposal in landfills), and so on.

Processing aids may be added to improve the extrusion characteristics of a polymer by facilitating lower extrusion pressures or reducing melt fracture, for instance. Examples of processing aids are flow promoters which may lubricated the metal surface in which the molten polymer contacts, reducing drag and thus reducing melt fracture and other theological-induced surface imperfections. Flow promoters can also reduce extrusion power consumption, and build-up or accumulation of polymer at the extrusion die. Flow promoters in polyethylene resin extrusion may include fluoroelastomers (which reduce melt fracture and improves resin processability), polyethylene glycol, and low molecular weight PE waxes, and so forth.

In general, the extruder 356 may melt, homogenize, and pump the polyolefin polymer and additives through a pelletizer 358, which may include a screen pack and heated die head, for example, which pelletizes the mixture of fluff and additives. Further, pelletizer knife blades (i.e., under water) may cut the polyolefin melt extruded through the die into pellets. The pellets are typically quenched by water 360 and may travel in a pellet-water slurry 362 from the pelletizer 358 to a pellet dewatering dryer 364. The dryer 364 may separate the free water and then dry the remaining surface water from the pellets by centrifugal force. The dried pellets 366 may discharge onto a scalping screen 368, for example, which removes oversized and undersized pellets from on-specification pellets 370.

Water 360 may be supplied to the pelletizer 358 from a water tank 372 via a centrifugal pump 374 and cooler 376 (e.g., shell and tube heat exchanger). Water 378 removed from the pellet dryer 364 may return to the water tank 372. The polyolefin pellets 370 exiting the scalping screen 368 may fall by gravity through a rotary valve 380 into a dense-phase pneumatic conveying line 382, for example, and transported to pellet silos 384. A blower package 386 provides nitrogen and/or air 388 to convey the pellets 370 via conveying line 382 to the pellet silos 384. In certain examples, the pellet silos 384 may be characterized as the interface of between the extrusion system 36 and the loadout system 39, as components of the extrusion 36 and/or loadout system 39, and the like.

The pellet silos 384 may include storage tanks, blenders, off-specification storage tanks, and so on. The polyolefin pellets 390 may be loaded into rail cars 392, hopper cars, trucks, tote bins, bags, and so on. Pellets 390 may be loaded into hopper cars, for example, using a gravity type, air assisted, multiple-spout, loading system. Such a system may allow the hopper car to be automatically loaded at a rate higher than the polymerization and extrusion production rate. Thus, extra "time" generated by the higher loadout rates may be exploited to provide time to move the hopper cars or rail cars 392 after filling, and to spot the next empty car 392.

Figure 15A:
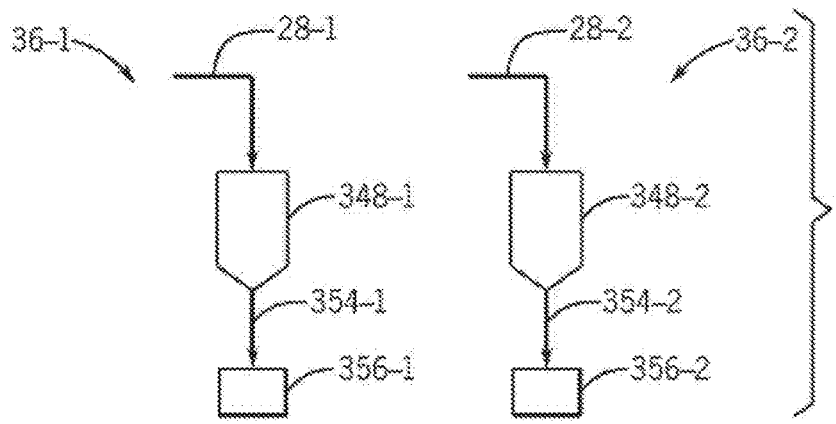
FIGS. 15A-15C are process flow diagrams of exemplary alternatives for the extrusion system of FIGS. 1 and 14 in accordance with embodiments of the present techniques.
Figure 15B:
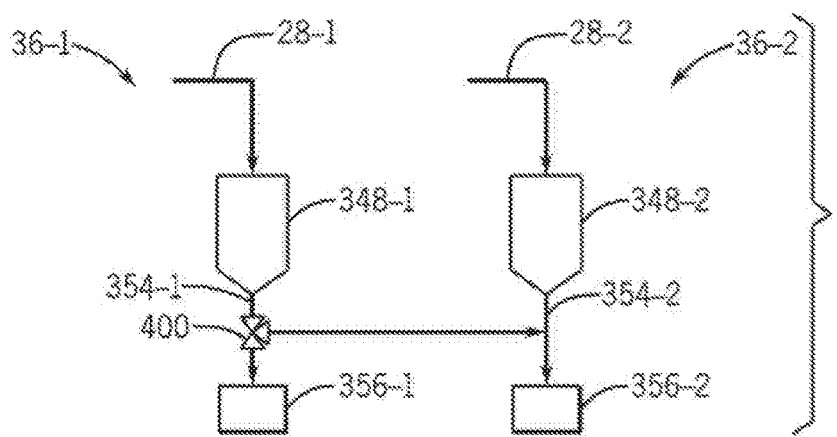
Figure 15C:
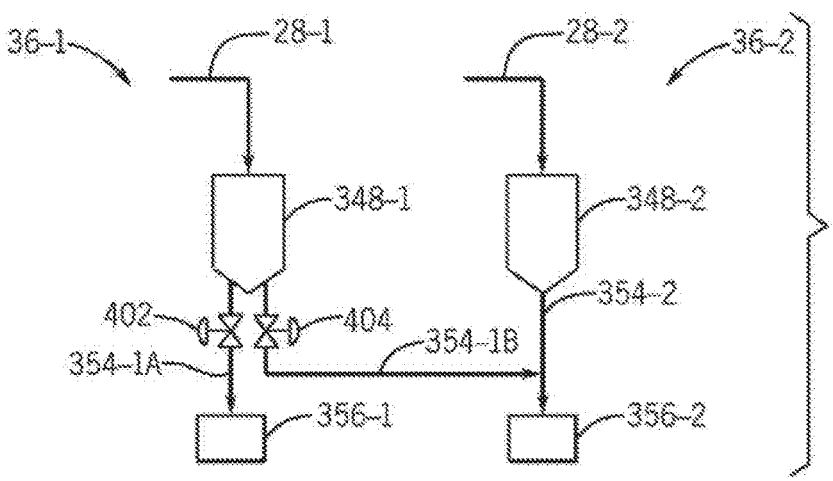

FIGS. 15A-15C depict exemplary embodiments of portions of two extrusion systems 36-1 and 36-2 including respective extruder feed tanks 348-1 and 348-2 and respective extruders 356-1 and 356-2. The extruder feed tank 348-1 receives treated fluff solids 28-1 from a monomer/diluent recovery system 24-1. The extruder feed tank 348-2 receives treated fluff solids 28-2 from a monomer/diluent recovery system 24-2. FIG. 15A in analogous to FIG. 16 in that the first extruder feed tank 348-1 feeds fluff 354-1 to the first extruder 356-1, and the second extruder feed tank 348-2 feeds fluff 354-2 to the second extruder 356-2.

The alternate embodiments of FIGS. 15B and 15C provide capability to combine the treated fluff solids 28-1 and 28-2 to the extruder 256-2. Thus, if desired, the extruder 356-1 may be taken offline for inspection or maintenance, and/or the fluff solids 28-1 and 28-2 combined for inclusion of the same additive package, for example. The embodiment in FIG. 15C also provides the capability to divide the treated fluff solids 28-1 between the two extruders 256-1 and 256-2, such as when desired to incorporate two different additive packages via parallel pelletizing of split streams of the fluff solids 28-1.

In FIG. 15B, the first extruder feed tank 348-1 may feed fluff 354-1 to the first extruder 356-1 or the second extruder 356-2. A diverter or 3-way valve 400 diverts the fluff 354-1 from the first extruder feed tank 348-1 to either the first extruder 356-1 or the second extruder 356-2. As for the second extruder feed tank 348-2, it feeds fluff 354-2 to the second extruder 356-2. Thus, in this example, the treated fluff solids 28-1 from a monomer/diluent recovery system 24-1 may be fed to extruder 356-1 or to extruder 356-2.

FIG. 15C depicts the capability for the first extruder feed tank 348-1 to feed fluff 354-1A through a level control valve 402 to the first extruder 356-1 and to feed fluff 354-1B through a level control valve 404 to the second extruder 356-2. In operation, the fluff 354-1A and 354-1B streams may flow simultaneously, with both control valves 402 and 404 operating to maintain a fluff level in the extruder feed tank 348-1. On the other hand, one of the control valves 402 and 404 may be closed such that only one of the fluff 354-1A and 354-1B streams flow. As for the second extruder feed tank 348-2, it feeds fluff 354-2 to the second extruder 356-2. Thus, in this example, the treated fluff solids 28-1 from a monomer/diluent recovery system 24-1 may be fed to only extruder 356-1, fed to only to extruder 356-2, or split and fed to both extruder 356-1 and 356-2 at the same time.

In summary, embodiments of the present techniques may provide for a polyolefin production system including: a first reactor (e.g., loop reactor) configured to produce a first reactor discharge having a first polyolefin (e.g., polyethylene); a second reactor (e.g., loop reactor) configured to produce a second reactor discharge comprising a second polyolefin (e.g. polyethylene); and a post-reactor treatment zone configured to receive the first reactor discharge and the second reactor discharge, wherein the first and second reactors are configured to allow the first reactor discharge to be (a) transferred to the second reactor and, alternatively, (b) diverted to by-pass the second reactor and fed into the post-reactor treatment zone wherein the first and second polyolefins are first contacted in the post-reactor treatment zone. The first polyolefin may have a higher average molecular weight than the second polyolefin, or the second polyolefin has a higher average molecular weight than the first polyolefin. Further, the first polyolefin and the second polyolefin may have different densities. Moreover, the first polyolefin may be 30 weight % to 70 weight % of the second polyolefin. The post-reactor treatment zone may include a separation vessel, purge column, extruder feed tank, extruder, and so on. The first and second polyolefins may be transferred to the post-reactor treatment zone such that the first and second polyolefins are first contacted in the separation vessel, purge column, extruder feed tank, or extruder, and the like.

Further, embodiments of the present techniques may provide a polyolefin production system including a first-reactor to produce a first reactor discharge having polyolefin and non-polyolefin components, and a post-reactor treatment zone to receive the first reactor discharge and produce a first extruded polyolefin and a second extruded polyolefin. The post-reactor treatment zone may include a separation vessel configured to receive the first reactor discharge and produce first and second separation-vessel product streams. The post-reactor treatment zone may include a separation vessel and a purge column, wherein the separation vessel receives the first reactor discharge and produces a separation-vessel product stream, and the purge column receives the separation-vessel product stream and produces first and second purge-column product streams. The post-reactor treatment zone may include a separation vessel, a purge column, and an extruder feed tank. In this example, the separation vessel receives the first reactor discharge and produces a separation-vessel product stream, the purge column receives the separation-vessel product stream and produces a purge-column product stream, and the extruder feed receives the purge-column product stream and produce first and second extruder-tank product streams.

In certain examples, a second reactor produces a second reactor discharge which is fed into the first reactor. Thus, in these examples, the initial reactor in series is labeled as the second reactor. The polyolefin in the second reactor discharge may have a higher or lower average molecular weight than polyolefin in the first reactor discharge. Further, polyolefin in the second reactor discharge may have a different density than polyolefin in the first reactor discharge. Polyolefin in the second reactor discharge may be 30 weight % to 70 weight % of polyolefin in the second reactor discharge. Moreover, the first extruded polyolefin and the second extruded polyolefin may have different additive packages. The different additive packages may include surface modifiers, UV inhibitors, antioxidants, colorants, pigments, or any combination thereof.

Lastly, embodiments of the present techniques may provide a polyolefin production system including: a first reactor to produce a first discharge slurry having a first polyolefin; a second reactor to produce a second discharge slurry having a second polyolefin; and a post-reactor treatment zone having a separation vessel configured to receive as separate feeds the first discharge slurry and the second discharge slurry in certain operating modes. The first and second reactors may be configured to allow the first discharge slurry to be (a) transferred to the second reactor and, alternatively, (b) diverted to by-pass the second reactor and fed into the post-reactor treatment zone. In embodiments, the first discharge slurry and the second discharge slurry initially meet in the separation vessel, and do not meet upstream of the separation vessel. In certain examples, the first discharge slurry and the second discharge slurry do not initially meet in a conduit but first meet in a vessel, such as the separation vessel or other vessel, i.e., with the vessel having two inlets to receive respectively the first discharge slurry and the second discharge slurry.

The post-reactor treatment zone may include the separation vessel, a purge column, an extruder feed tank, and an extruder, and so forth. Of course, alternate configurations are applicable. The first and second polyolefins may be transferred to the s post-reactor treatment zone such that the first and second polyolefins initially meet in the separation vessel, purge column, extruder feed tank, or extruder, etc. Some embodiments also provide that the first and second polyolefins may meet in the inlet piping of the purge column, inlet piping of the extruder feed tank, and inlet piping of the extruder, but not in inlet piping of the separation vessel (e.g., flash vessel). As indicated, the first polyolefin may have a higher or lower average molecular weight than the second polyolefin, and a different density than the second polyolefin. The first polyolefin may be 30 weight % to 70 weight % of the second polyolefin.

Additional Description

A polyolefin production system has been described. The following clauses are offered as further description:

Embodiment A

A polyolefin production system comprising: a first reactor configured to produce a first reactor discharge comprising a first polyolefin; a second reactor configured to produce a second reactor discharge comprising a second polyolefin; a post-reactor treatment zone configured to receive the first reactor discharge and the second reactor discharge, wherein the first and second reactors are configured to allow the first reactor discharge to be (a) transferred to the second reactor and, alternatively, (b) diverted to by-pass the second reactor and fed into the post-reactor treatment zone wherein the first and second polyolefins are first contacted in the post-reactor treatment zone.

The polyolefin production system of embodiment A, wherein the first reactor and the second reactor each comprise a loop reactor.

Embodiment C

The polyolefin production system of embodiments A through B, wherein: the post-reactor treatment zone comprises a separation vessel; and the first and second polyolefins are transferred to the pressure separation vessel such that the first and second polyolefins are first contacted in the separation vessel.

Embodiment D

The polyolefin production system of embodiments A through C, wherein: the post-reactor treatment zone comprises a purge column; and the first and second polyolefins are transferred to the purge column such that the first and second polyolefins are first contacted in the purge column.

Embodiment E

The polyolefin production system of embodiments A through D, wherein: the post-reactor treatment zone comprises an extruder feed tank; and the first and second polyolefins are transferred to the extruder feed tank such that the first and second polyolefins are first contacted in the extruder feed tank.

Embodiment F

The polyolefin production system of embodiments A through E, wherein: the post-reactor treatment zone comprises an extruder; and the first and second polyolefins are transferred to the extruder such that the first and second polyolefins are first contacted at the inlet of and blended in the extruder.

Embodiment G

The polyolefin production system of embodiments A through F, wherein the first and second polyolefins are polyethylene.

Embodiment H

The polyolefin production system of embodiments A through G, wherein the first polyolefin has a higher average molecular weight than the second polyolefin.

Embodiment I

The polyolefin production system of embodiments A through H, wherein the second polyolefin has a higher average molecular weight than the first polyolefin.

Embodiment J

The polyolefin production system of embodiments A through I, wherein the first polyolefin has a different density than the second polyolefin.

Embodiment K

The polyolefin production system of embodiments A through J, wherein the first polyolefin is 30 weight % to 70 weight % of the second polyolefin.

Embodiment L

The polyolefin production system of embodiments A through K, wherein the post-reactor treatment zone comprises an extruder feed tank and an extruder, and wherein performance additives are added into at least one of the extruder feed tank or the extruder.

Embodiment M

A polyolefin production system comprising: a first-reactor configured to produce a first reactor discharge comprising polyolefin and non-polyolefin components: and a post-reactor treatment zone configured to receive the first reactor discharge and produce a first extruded polyolefin and a second extruded polyolefin.

Embodiment N

The polyolefin production system of embodiment M, wherein the post-reactor treatment zone comprises a separation vessel configured to receive the first reactor discharge and produce first and second separation-vessel product streams.

Embodiment O

The polyolefin production system of embodiments M through N, wherein: the post-reactor treatment zone comprises a separation vessel and a purge column, wherein: the separation vessel is configured to receive the first reactor discharge and produce a separation-vessel product stream, and the purge column is configured to receive the separation-vessel product stream and produce first and second purge-column product streams.

Embodiment P

The polyolefin production system of embodiments M through O, wherein: the post-reactor treatment zone comprises a separation vessel, a purge column, and an extruder feed tank; the separation vessel is configured to receive the first reactor discharge and produce a separation-vessel product stream, the purge column is configured to receive the separation-vessel product stream and produce a purge-column product stream, and the extruder feed tank is configured to receive the purge-column product stream and produce first and second extruder-tank product streams.

Embodiment O

The polyolefin production system of embodiments M through P, further comprising a second reactor configured to produce a second reactor discharge which is fed into the first reactor.

Embodiment R

The polyolefin production system of embodiments M through Q, wherein polyolefin in the second reactor discharge has a higher average molecular weight than polyolefin in the first reactor discharge.

Embodiment S

The polyolefin production system of embodiments M through R, wherein polyolefin the first reactor discharge has a higher average molecular weight than polyolefin the second reactor discharge.

Embodiment T

The polyoletin production system of embodiments M through S, wherein polyolefin in the second reactor discharge has a different density than polyolefin in the first reactor discharge.

Embodiment U

The polyolefin production system of embodiments M through T, wherein polyolefin in the second reactor discharge is 30 weight % to 70 weight % of polyolefin in the second reactor discharge.

Embodiment V

The polyolefin production system of embodiments M through U, wherein the first extruded polyolefin and the second extruded polyolefin comprise different additive packages

Embodiment W

The polyolefin production system of embodiments M through V, wherein the different additive packages comprise surface modifiers, UV inhibitors, antioxidants, colorants, pigments, or any combination thereof.

Embodiment X

A polyolefin production system comprising: a first reactor configured to produce a first discharge slurry comprising a first polyolefin; a second reactor configured to produce a second discharge slurry comprising a second polyolefin; and a post-reactor treatment zone comprising a separation vessel configured to receive as separate feeds the first discharge slurry and the second discharge slurry.

Embodiment Y

The polyolefin production system of embodiment X, wherein the first and second reactors are configured to allow the first discharge slurry to be (a) transferred to the second reactor and, alternatively. (b) diverted to by-pass the second reactor and fed into the post-reactor treatment zone.

Embodiment Z

The polyolefin production system of embodiments X through Y, wherein the first discharge slurry and the second discharge slurry initially meet in the separation vessel.

Embodiment AA

The polyolefin production system of embodiments X through Z, wherein the first discharge slurry and the second discharge slurry do not meet upstream of the separation vessel.

Embodiment AB

The polyolefin production system of embodiments X through AA, wherein the first discharge slurry and the second discharge slurry do not initially meet in a conduit.

Embodiment AC

The polyolefin production system of embodiments X through AB, wherein the first and second polyolefins are transferred to the separation vessel such that the first and second polyolefins initially meet in the separation vessel.

Embodiment AD

The polyolefin production system of embodiments X through AC, wherein: the post-reactor treatment zone comprises a purge column: and the first and second polyolefins are transferred to the purge column such that the first and second polyolefins initially meet in inlet piping of the purge column or in the purge column.

Embodiment AE

The polyolefin production system of embodiments X through AD, wherein: the post-reactor treatment zone comprises an extruder feed tank; and the first and second polyolefins are transferred to the extruder feed tank such that the first and second polyolefins initially meet in inlet piping of the extruder feed tank or in the extruder feed tank.

Embodiment AF

The polyolefin production system of embodiments X through AE, wherein: the post-reactor treatment zone comprises an extruder; and the first and second polyolefins are transferred to the extruder such that the first and second polyolefins initially meet in inlet piping of the extruder or in the extruder, and are blended in the extruder.

Embodiment AG

The polyolefin production system of embodiments X through AF, wherein the first polyolefin has a higher average molecular weight than the second polyolefin.

Embodiment AH

The polyolefin production system of embodiments X through AG, wherein the second polyolefin has a higher average molecular weight than the first polyolefin.

Embodiment AI

The polyolefin production system of embodiments X through A-H, wherein the first polyolefin has a different density than the second polyolefin.

Embodiment AJ

The polyolefin production system of embodiments X through AI, wherein the first polyolefin is 30 weight % to 70 weight % of the second polyolefin.

What is claimed is:

1. A polyolefin production system comprising:
a first loop slurry reactor configured to produce a first reactor discharge comprising a first solid polyolefin;
a second loop slurry reactor configured to produce a second reactor discharge comprising a second solid polyolefin; and
a post-reactor treatment zone configured to receive the first reactor discharge and the second reactor discharge, wherein the first and second loop slurry reactors are configured to allow the first reactor discharge to be (a) transferred to the second reactor and, alternatively, (b) diverted to by-pass the second reactor and fed into the post-reactor treatment zone wherein to the first and second solid polyolefins are first contacted in the post-reactor treatment zone, and
wherein the first solid polyolefin is 30 weight % to 70 weight % of the second solid polyolefin.

2. The polyolefin production system of claim 1, wherein:
the post-reactor treatment zone comprises a separation vessel; and
the first and second solid polyolefins are transferred to the separation vessel such that the first and second solid polyolefins are first contacted in the separation vessel.

3. The polyolefin production system of claim 1, wherein:
the post-reactor treatment zone comprises a purge column; and
the first and second solid polyolefins are transferred to the purge column such that the first and second solid polyolefins are first contacted in the purge column.

4. The polyolefin production system of claim 1, wherein:
the post-reactor treatment zone comprises an extruder feed tank; and
the first and second solid polyolefins are transferred to the extruder feed tank such that the first and second solid polyolefins are first contacted in the extruder feed tank.

5. The polyolefin production system of claim 1, wherein:
the post-reactor treatment zone comprises an extruder; and
the first and second solid polyolefins are transferred to the extruder such that the first and second solid polyolefins are first contacted at the inlet of and blended in the extruder.

6. The polyolefin production system of claim 1, wherein the first and second solid polyolefins are polyethylene.

7. The polyolefin production system of claim 1, wherein the first solid polyolefin has a higher average molecular weight than the second solid polyolefin.

8. The polyolefin production system of claim 1, wherein the second solid polyolefin has a higher average molecular weight than the first solid polyolefin.

9. The polyolefin production system of claim 1, wherein the first solid polyolefin has a different density than the second solid polyolefin.

10. The polyolefin production system of claim 1, wherein the first and second solid polyolefins consist essentially of polyethylene.

11. The polyolefin production system of claim 1, wherein the post-reactor treatment zone comprises an extruder feed tank and an extruder, and wherein performance additives are added into at least one of the extruder feed tank or the extruder.

12. A polyolefin production system comprising:
a first-loop slurry reactor configured to produce a first reactor discharge comprising a first solid polyolefin component and a non-polyolefin component;
a second loop slurry reactor configured to produce a second reactor discharge comprising a second solid polyolefin which is fed into the first reactor; and
a post-reactor treatment zone configured to receive the first reactor discharge and produce a first extruded polyolefin and a second extruded polyolefin,
wherein the first reactor and the second reactor are configured such that the first solid polyolefin in the first reactor discharge is 30 weight % to 70 weight % of the second solid polyolefin in the second reactor discharge.

13. The polyolefin production system of claim 12, wherein the post-reactor treatment zone comprises a separation vessel configured to receive the first reactor discharge and produce first and second separation-vessel product streams.

14. The polyolefin production system of claim 12, wherein:
the post-reactor treatment zone comprises a separation vessel and a purge column, wherein:
the separation vessel is configured to receive the first reactor discharge and produce a separation-vessel product stream, and
the purge column is configured to receive the separation-vessel product stream and produce first and second purge-column product streams.

15. The polyolefin production system of claim 12, wherein:
the post-reactor treatment zone comprises a separation vessel, a purge column, and an extruder feed tank;
the separation vessel is configured to receive the first reactor discharge and produce a separation-vessel product stream,
the purge column is configured to receive the separation-vessel product stream and produce a purge-column product stream, and
the extruder feed tank is configured to receive the purge-column product stream and produce first and second extruder-tank product streams.

16. The polyolefin production system of claim 12, wherein the second solid polyolefin in the second reactor discharge has a higher average molecular weight than the first solid polyolefin in the first reactor discharge.

17. The polyolefin production system of claim 12, wherein the first solid polyolefin the first reactor discharge has a higher average molecular weight than the second solid polyolefin the second reactor discharge.

18. The polyolefin production system of claim 12, wherein the second solid polyolefin in the second reactor discharge has a different density than the first solid polyolefin in the first reactor discharge.

19. The polyolefin production system of claim 12, wherein the first solid polyolefin in the first reactor discharge and the second solid polyolefin in the second reactor discharge consist essentially of polyethylene.

20. The polyolefin production system of claim 12, wherein the first extruded polyolefin and the second extruded polyolefin comprise different additive packages.

21. The polyolefin production system of claim 20, wherein the different additive packages comprise surface modifiers, UV inhibitors, antioxidants, colorants, pigments, or any combination thereof.

22. A polyolefin production system comprising:
a first loop slurry reactor configured to produce a first discharge slurry comprising a first solid polyolefin;
a second loop slurry reactor configured to produce a second discharge slurry comprising a second solid polyolefin; and a post-reactor treatment zone comprising a separation vessel configured to receive as separate feeds the first discharge slurry and the second discharge slurry, wherein the first polyolefin is 30 weight % to 70 weight % of the second polyolefin.

23. The polyolefin production system of claim 22, wherein the first and second reactors are configured to allow the first discharge slurry to be (a) transferred to the second reactor and, alternatively, (b) diverted to by-pass the second reactor and fed into the post-reactor treatment zone.

24. The polyolefin production system of claim 22, wherein the first discharge slurry and the second discharge slurry initially meet in the separation vessel.

25. The polyolefin production system of claim 22, wherein the first discharge slurry and the second discharge slurry do not meet upstream of the separation vessel.

26. The polyolefin production system of claim 22, wherein the first discharge slurry and the second discharge slurry do not initially meet in a conduit.

27. The polyolefin production system of claim 22, wherein the first and second solid polyolefins are transferred to the separation vessel such that the first and second solid polyolefins initially meet in the separation vessel.

28. The polyolefin production system of claim 22, wherein:
the post-reactor treatment zone comprises a purge column; and
the first and second solid polyolefins are transferred to the purge column such that the first and second solid polyolefins initially meet in inlet piping of the purge column or in the purge column.

29. The polyolefin production system of claim 22, wherein:
the post-reactor treatment zone comprises an extruder feed tank; and
the first and second polyolefins are transferred to the extruder feed tank such that the first and second solid polyolefins initially meet in inlet piping of the extruder feed tank or in the extruder feed tank.

30. The polyolefin production system of claim 22, wherein:
the post-reactor treatment zone comprises an extruder; and
the first and second solid polyolefins are transferred to the extruder such that the first and second solid polyolefins initially meet in inlet piping of the extruder or in the extruder, and are blended in the extruder.

31. The polyolefin production system of claim 22, wherein the first solid polyolefin has a higher average molecular weight than the second solid polyolefin.

32. The polyolefin production system of claim 22, wherein the second solid polyolefin has a higher average molecular weight than the first solid polyolefin.

33. The polyolefin production system of claim 22, wherein the first solid polyolefin has a different density than the second solid polyolefin.

34. The polyolefin production system of claim 22, wherein the first and second solid polyolefins consist essentially of polyethylene.

* * * * *